(12) United States Patent
Mori et al.

(10) Patent No.: US 8,982,486 B2
(45) Date of Patent: Mar. 17, 2015

(54) IMAGE PICKUP LENS UNIT MANUFACTURING METHOD AND IMAGE PICKUP LENS UNIT

(75) Inventors: Hajime Mori, Fuchu (JP); Takashi Fujii, Hino (JP); Takemi Miyazaki, Hamura (JP)

(73) Assignee: Konica Minolta Advanced Layers, Inc., Tokyo (JP)

(*) Notice: Subject to any disclaimer, the term of this patent is extended or adjusted under 35 U.S.C. 154(b) by 79 days.

(21) Appl. No.: 13/825,719

(22) PCT Filed: Sep. 9, 2011

(86) PCT No.: PCT/JP2011/070654
§ 371 (c)(1),
(2), (4) Date: Jun. 21, 2013

(87) PCT Pub. No.: WO2012/039304
PCT Pub. Date: Mar. 29, 2012

(65) Prior Publication Data
US 2014/0168796 A1    Jun. 19, 2014

(30) Foreign Application Priority Data

Sep. 22, 2010 (JP) .................................. 2010-212902
Sep. 30, 2010 (JP) .................................. 2010-223315

(51) Int. Cl.
*G02B 7/02* (2006.01)
*B29C 45/16* (2006.01)
*B29L 11/00* (2006.01)

(52) U.S. Cl.
CPC .............. *G02B 7/02* (2013.01); *B29C 45/1671* (2013.01); *B29C 2045/1673* (2013.01); *B29L 2011/0016* (2013.01); *Y10S 359/90* (2013.01)
USPC .......................................... 359/819; 359/900

(58) Field of Classification Search
USPC .......................................... 359/811, 819, 900
See application file for complete search history.

(56) References Cited

FOREIGN PATENT DOCUMENTS

| JP | 2008-195008 | 8/2008 |
|---|---|---|
| JP | 2008-221565 | 9/2008 |
| JP | 2009-300626 | 12/2009 |
| JP | 2010-139566 | 6/2010 |
| JP | 2010-139625 | 6/2010 |

*Primary Examiner* — Jack Dinh
(74) *Attorney, Agent, or Firm* — Cozen O'Connor

(57) ABSTRACT

An image pickup lens unit, in which a holder body and a cover can be easily connected together, without additional components and a resin flow path for the connection. A lens 10 is positioned in a first holder member 20 which remains in a mold. A second holder member 30 for preventing the lens 10 from falling off is molded such that it is welded to the first holder member having the lens 10 positioned therein. This facilitates molding of the second holder member 30 and joining of the second holder member 30 to the first holder member 20 at the same time. Since there is no need to provide a resin flow path for joining the first holder member 20 and the second holder member 30 together, the image pickup lens unit can be made small in size.

24 Claims, 19 Drawing Sheets

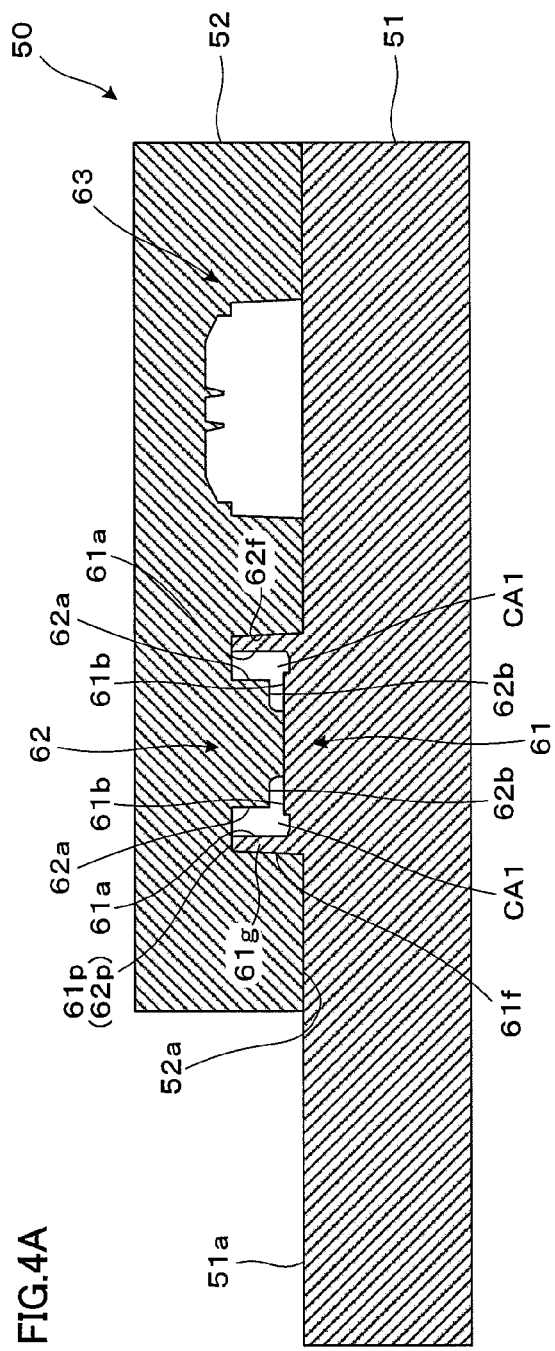
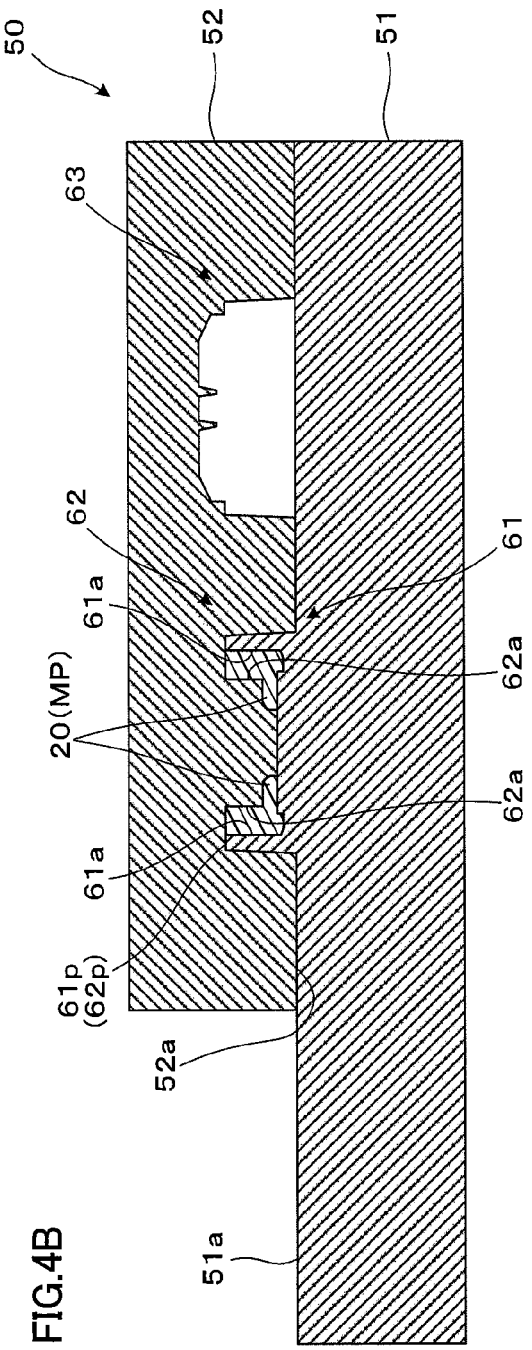

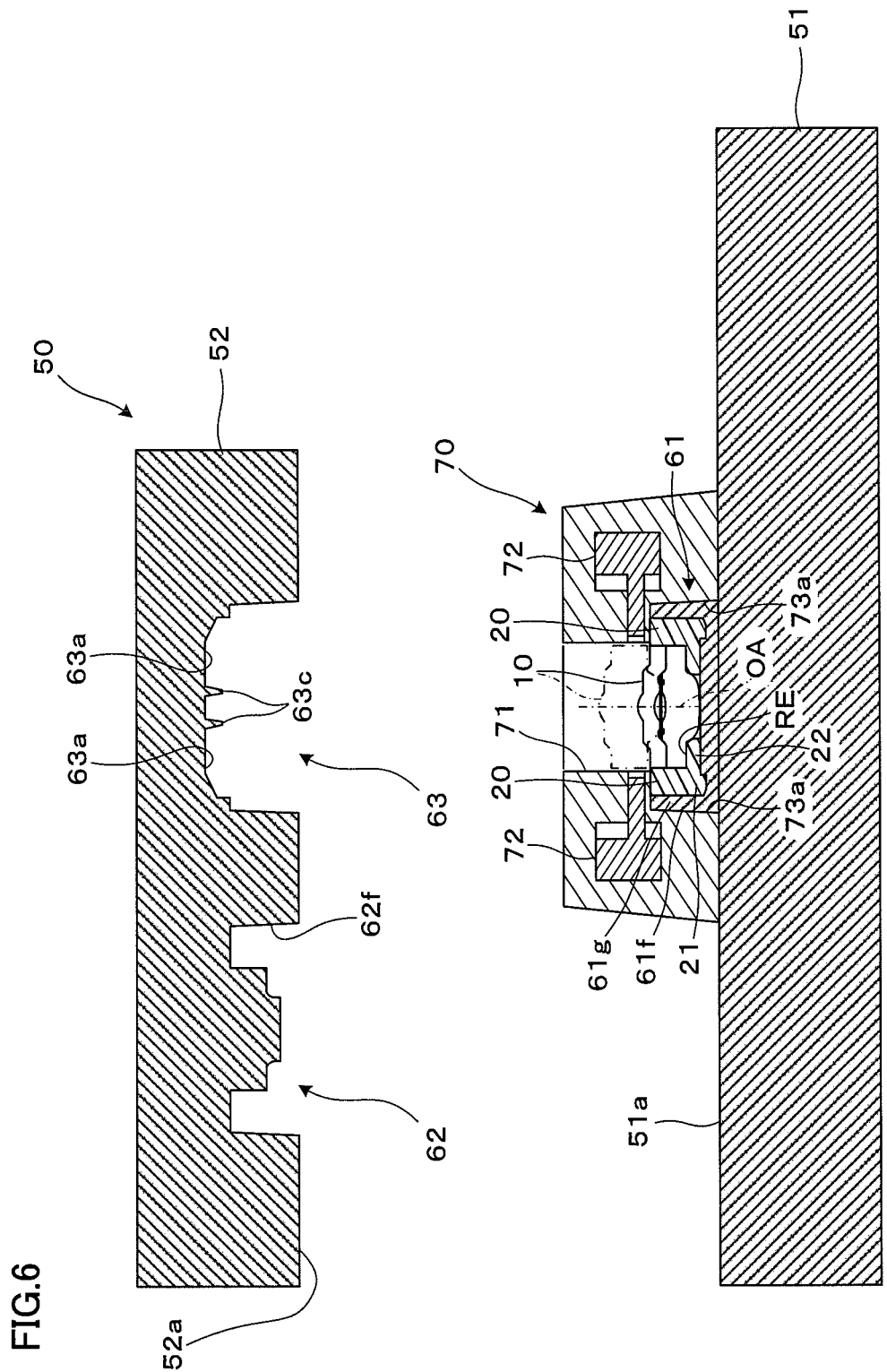

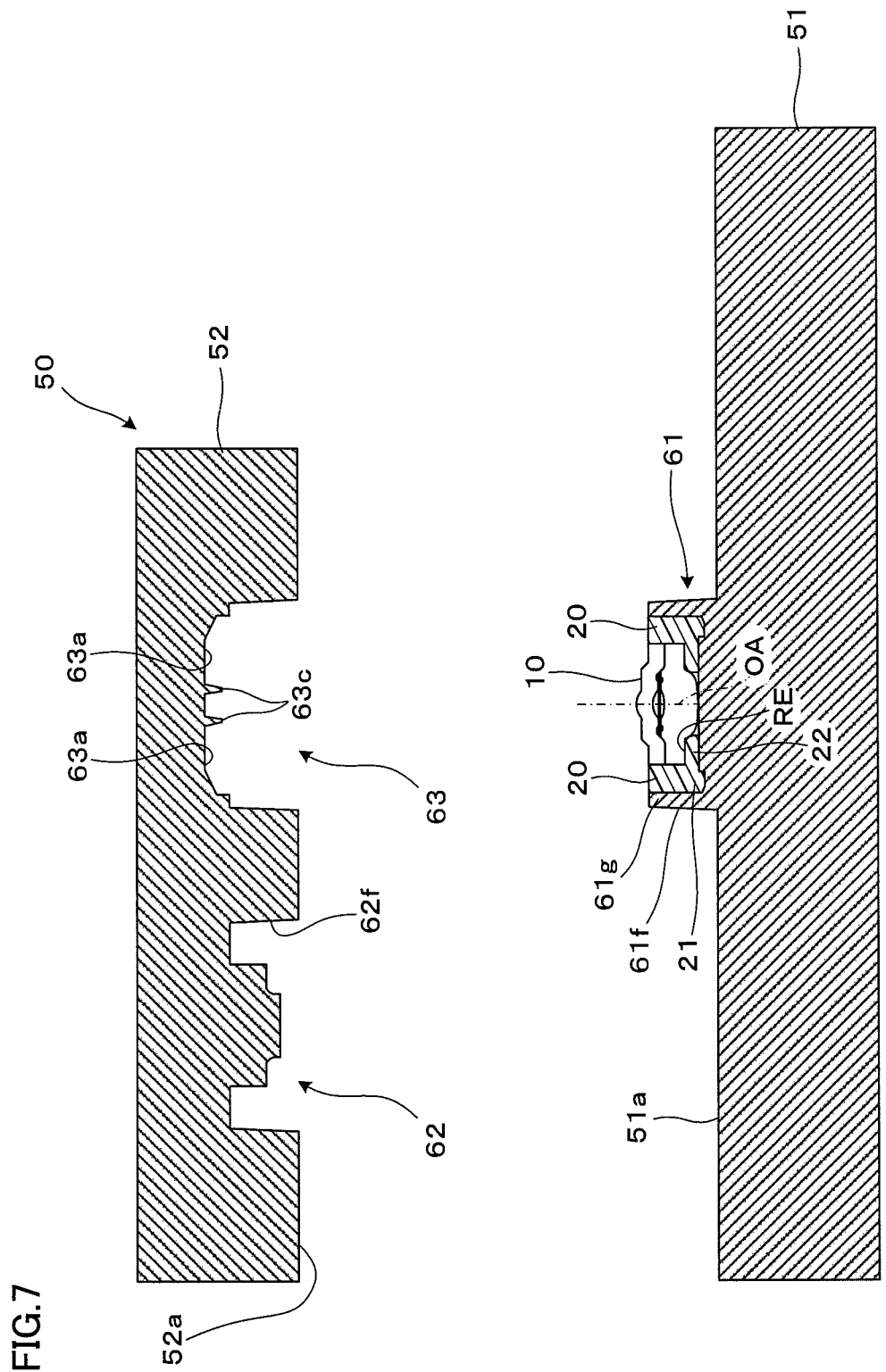

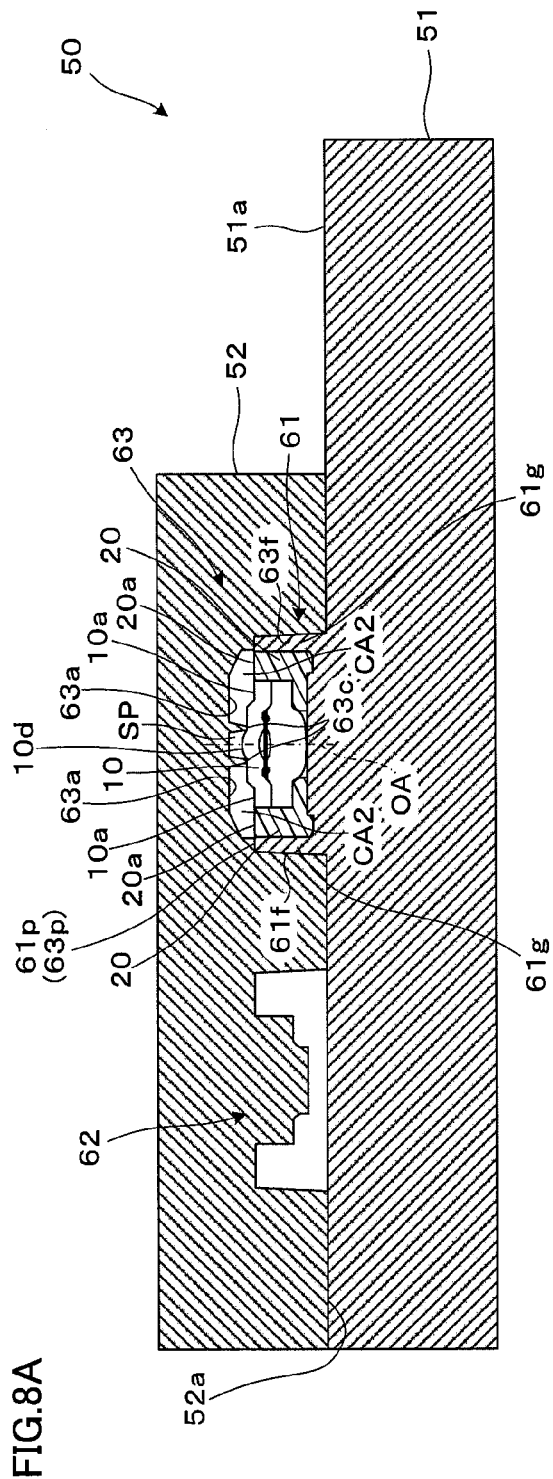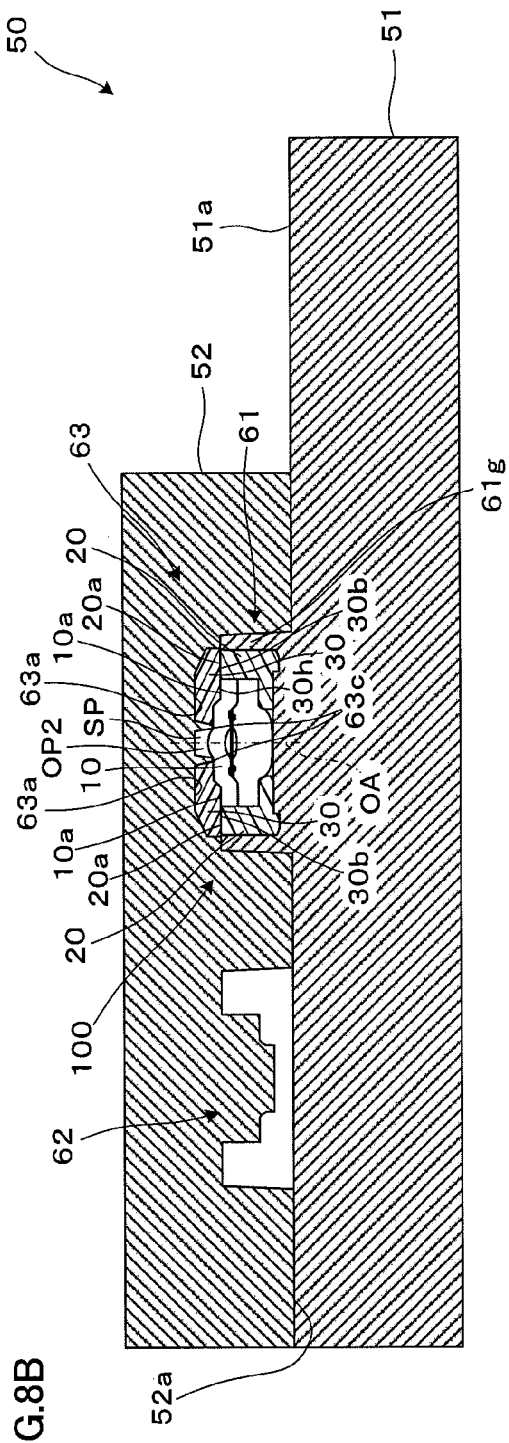
FIG.8A
FIG.8B

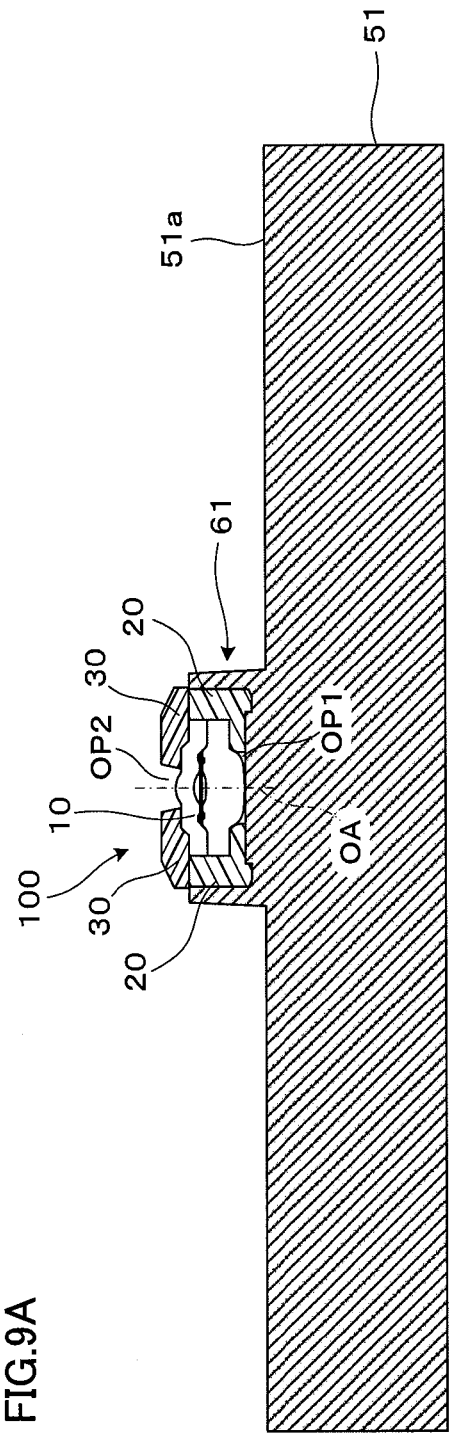
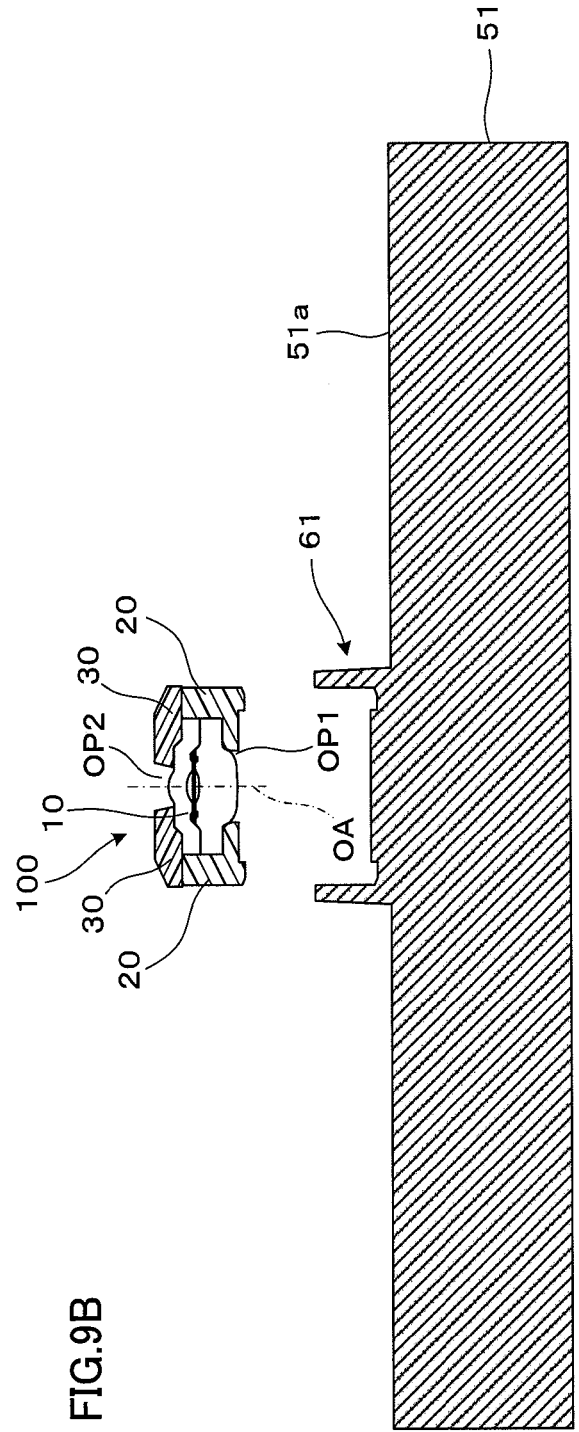

IMAGE PICKUP LENS UNIT MANUFACTURING METHOD AND IMAGE PICKUP LENS UNIT

RELATED APPLICATIONS

This is a U.S. national stage of application No. PCT/JP2011/070654 filed on Sep. 9, 2011.

This patent application claims the priority of Japanese application no. 2010-212902 filed Sep. 22, 2010 and JP 2010-223315 filed Sep. 30, 2010, the disclosure content of both of which are hereby incorporated by reference.

TECHNICAL FIELD

The present invention relates to a method for manufacturing an image pickup lens unit having a lens mounted in a holder, and also relates to the image pickup lens unit.

BACKGROUND ART

An image pickup lens unit included in mobile phones has a structure in which a surrounding of an optical lens is held by a holder. Typically, the optical lens is mounted into the holder by an automatic assembly system that has a very high positioning accuracy and uses an image recognition technique. However, such a system is not only very costly, but also requires a very large space because production lines are set up for different steps, such as a step of inserting a lens into a holder and a step of bonding the lens to the holder. As a result, facility replacement carried out for each change of lens type involves very extensive work, and hence many worker-hours are required.

A manufacturing method that addresses the problems described above is known. In this method, first, a plurality of resin optical lenses and a holder body and a cover for holding the optical lenses are individually molded in different portions of the same mold. Next, these resin members are moved and assembled while the holder body remains in the mold. Then, molding is performed again to form a molded assembly (see Patent Literature (PTL) 1).

Another manufacturing method is known in which, after an optical glass lens and a stop (or diaphragm) are positioned and set in a mold in advance, a holder is formed around the optical glass lens by injection molding to assemble an image pickup lens unit at the same time (see PTL 2).

However, the manufacturing method disclosed in PTL 1 is disadvantageous in that it increases the number of molded components for joining the cover to the holder body and makes the molding step complicated. Additionally, since a resin flow path for such joining components needs to be created, it is very difficult to ensure filling properties and joint strength of a thin-wall holder used in an image pickup lens unit to be included in mobile phones. Therefore, it is difficult to achieve downsizing desired for such an image pickup lens unit to be included in mobile phones.

Also, in the manufacturing method disclosed in PTL 2, the optical lens and the stop need to be directly held between molds. If the holding force is not sufficient enough, resin that flows out through gaps may adhere to the optical surface of the optical lens or to the stop. On the other hand, if the holding force is too large, the optical lens or the stop may be deformed or damaged. Thus, since the allowable range of holding force is narrow, it is very difficult to carry out the holding operation. Additionally, since a positioning shape for positioning the lens is formed in the molds, the positioning shape may remain as a visible depression in the resulting molded part. Then, the entry of unnecessary light into the depression may cause optical defects, such as ghosts and flares. At the same time, visual specifications required for the image pickup lens unit to be included in products, such as image pickup apparatuses, may not be met. Moreover, such a positioning shape may cause deformation during mold releasing and may deteriorate the dimensional accuracy.

CITATION LIST

Patent Literature

PTL 1: Japanese Patent Application Publication No. 2008-221565
PTL 2: Japanese Patent Application Publication No. 2009-300626

SUMMARY OF INVENTION

An object of the present invention is to provide a method for manufacturing an image pickup lens unit in which a holder body and a cover can be easily connected together without the need for additional components, the image pickup lens unit can be made small in size, and it is possible to avoid the occurrence of ghosts and flares, visual defects, and deterioration of dimensional accuracy caused by the presence of a positioning shape.

Another object of the present invention is to provide an image pickup lens unit that is composed of a small number of components and can be made small in size, and in which it is possible to easily avoid the occurrence of ghosts and flares, visual defects, and deterioration of dimensional accuracy. Still another object of the present invention is to provide an image pickup lens unit that can be made small in size, but can stably hold a lens.

To achieve the objects described above, a first method for manufacturing an image pickup lens unit according to the present invention is a method for manufacturing an image pickup lens unit that includes a lens, a first holder member, and a second holder member configured to hold the lens in cooperation with the first holder member. The method includes a first molding step of pouring a resin material into a mold and molding the first holder member having a positioning portion for positioning the lens; a positioning step of inserting the lens into the first holder member inside the mold and positioning the lens by bringing the lens into contact with the positioning portion of the first holder member; and a second molding step of pouring a resin material into the mold and molding the second holder member such that the second holder member is welded to the first holder member placed inside the mold and having the lens positioned therein, the second holder member being configured to prevent the lens from falling off.

According to the first method for manufacturing the image pickup lens unit, in the second molding step, by performing molding on the first holder member having the lens positioned therein, the second holder member that prevents the lens from falling off is molded such that the second holder member is welded to the first holder member. It is thus possible to reliably perform molding of the second holder member and joining of the second holder member to the first holder member at the same time, avoid an increase in the number of components for holder assembly, and simplify the shapes of components at a connecting portion. In particular, since the second holder member and the first holder member can be welded together by molding the second holder member, the first holder member does not have to have a resin flow path used in secondary molding for joining the second holder member to the first holder member. Thus, the image pickup lens unit can be prevented from increasing in size. The second holder member is molded, with the lens positioned in the first holder member. Therefore, unlike a manufacturing method in which a lens is positioned only during molding by using a positioning member of a mold, it is possible to avoid deterioration of dimensional accuracy caused by the presence of a large positioning shape remaining as a space in the first holder member after molding.

A second method for manufacturing an image pickup lens unit according to the present invention is a method for manufacturing an image pickup lens unit that includes a lens having a first surface and a second surface on an opposite side of the first surface, the first surface and the second surface including a first optical surface and a second optical surface, respectively; a first holder member; and a second holder member configured to hold the lens in cooperation with the first holder member. The method includes a first molding step of pouring a resin material into a mold and molding the first holder member having a positioning portion for positioning the lens; a positioning step of inserting the lens into the first holder member inside the mold and positioning the lens by bringing the positioning portion into contact with a surrounding or periphery of the second optical surface of the lens; and a second molding step of pouring a resin material into the mold and molding the second holder member such that the second holder member is welded to the first holder member placed inside the mold and having the lens positioned therein, the second holder member being configured to prevent the lens from falling off. Note that the surrounding or periphery of the lens includes not only an annular region inside an outermost edge of the second optical surface, but also an annular region outside the outermost edge of the second optical surface.

According to the second method for manufacturing the image pickup lens unit, in the second molding step, by performing molding on the first holder member having the lens positioned therein, the second holder member that prevents the lens from falling off is molded such that the second holder member is welded to the first holder member. It is thus possible to reliably perform molding of the second holder member and joining of the second holder member to the first holder member at the same time, avoid an increase in the number of components for holder assembly, and simplify the shapes of components at a connecting portion. In particular, since the second holder member and the first holder member can be connected together by molding the second holder member, the first holder member does not have to have a resin flow path used in secondary molding for joining the second holder member to the first holder member. Thus, the image pickup lens unit can be prevented from increasing in size. The second holder member is molded, with the lens positioned in the first holder member. Therefore, unlike a manufacturing method in which a lens is positioned only during molding by using a positioning member of a mold, it is possible to avoid deterioration of dimensional accuracy caused by the presence of a large positioning shape remaining as a space in the first holder member after molding. Additionally, since the positioning is done by bringing the positioning portion into contact with the surrounding of the second optical surface of the lens, it is possible to achieve simple but precise positioning with respect to the first holder member and the entire holder.

According to a specific aspect of the present invention, in the second method for manufacturing the image pickup lens unit, the positioning portion comes into line contact or surface contact with an outer edge of the second optical surface of the lens.

According to another aspect of the present invention, the first holder member has a correcting member that corrects an inclination of the lens. In this case, the position of the lens can be adjusted not only for the direction perpendicular to the optical axis, but also for the inclination.

According to another aspect of the present invention, in the first or second method for manufacturing the image pickup lens unit, the mold for molding the second holder member directly presses the first optical surface of the lens against the first holder member. In this case, when the second holder member is molded in the second molding step, the lens can be stably held in the first holder member. Unlike a conventional method in which the lens is held between molds, the lens is supported on the back side thereof by the first holder member made of resin. Therefore, even when the lens is directly pressed by the mold for molding the second holder member, the first holder member which serves as a cushion can reduce the occurrence of damage to the lens.

According to another aspect of the present invention, the mold for molding the second holder member has a contact portion that faces a surrounding of an optical surface of the lens. In this case, the resin for forming the second holder member can be blocked by the contact portion and prevented from leaking toward the optical surface.

According to another aspect of the present invention, the mold for molding the second holder member has a contact surface that faces an optical surface of the lens, the contact surface having the same or substantially the same shape as the optical surface. In this case, since the contact surface has the same or substantially the same shape as the optical surface, the contact surface can come into contact with the entire optical surface. Thus, the resin for forming the second holder member can be blocked by the perimeter of the contact surface and prevented from leaking toward the optical surface.

According to another aspect of the present invention, the first holder member has a stop or diaphragm formed in advance. Thus, during assembly of the image pickup lens unit, there is no need to insert a separately formed stop in proximity to the first holder member. It is thus possible to simplify the process of manufacture.

According to another aspect of the present invention, the lens is a single lens component or a lens assembly that is an integrated combination of a plurality of lens elements. In this case, the process of inserting and positioning the lens in the first holder member can be simplified.

According to another aspect of the present invention, the lens assembly is an integrated combination of a plurality of lens elements and a stop interposed between the plurality of lens elements. In this case, it is possible to provide an image pickup lens unit having a stop inside the lens.

According to another aspect of the present invention, the lens includes a plurality of lens elements, which are sequentially inserted into the first holder member.

According to another aspect of the present invention, the lens has side surfaces forming a rectangular prism-like. In this case, from a wafer-like base material where many lenses are formed, individual lens elements can be easily cut out and used.

According to another aspect of the present invention, at least part of a first molding space for forming the first holder member in the first molding step and at least part of a second molding space for forming the second holder member in the second molding step are created in the same mold. In this case, since the first holder member and the second holder member can be molded using the same mold, it is possible not only to easily improve the processing accuracy, but also to save space on the apparatus for manufacturing the image pickup lens unit.

According to another aspect of the present invention, at least part of a third molding space for molding the lens is created in the same mold in which the at least part of the first molding space and the at least part of the second molding space are created. In this case, it is possible to save space on the apparatus for manufacturing the image pickup lens unit.

According to another aspect of the present invention, the first and second holder members and the lens are made of reflow heat-resistant material. In this case, the image pickup lens unit having heat resistance can be reflow-processed.

To solve the problems described above, a first image pickup lens unit according to the present invention includes a lens, a first holder member made of resin and having a positioning portion for positioning the lens, and a second holder member made of resin and configured to hold the lens in cooperation with the first holder member. The first holder member is in contact with the lens without being bonded thereto. The second holder member is welded to or adheres to the lens. The first holder member and the second holder member are joined to each other by welding.

In the first image pickup lens unit, where the first holder member and the second holder member are joined to each other by welding, it is possible to avoid an increase in the number of components for holder assembly while ensuring stable holding of the lens. Additionally, since the first holder member is molded before the lens is positioned, there is no need to position and support the lens during molding of the first holder member. Since no space resulting from positioning of the lens is created around the first holder member, it is possible to avoid deterioration of dimensional accuracy and occurrence of visual defects. Also, since there is no need to create a flow path for molding components for joining the first holder member and the second holder member together, the image pickup lens unit can be prevented from increasing in size. Moreover, since the second holder member is welded to or adheres to the lens, it is possible to reliably stabilize the holding of the lens while reducing the size of the image pickup lens unit.

To solve the problems described above, a second image pickup lens unit according to the present invention includes a lens having a first surface and a second surface on an opposite side of the first surface, the first surface and the second surface including a first optical surface and a second optical surface, respectively; a first holder member made of resin and having a positioning portion that comes into contact with a surrounding of the second optical surface of the lens for positioning the lens; and a second holder member made of resin and configured to hold the lens in cooperation with the first holder member. The first holder member is in contact with the lens without being bonded thereto. The second holder member is welded to or adheres to the lens. The first holder member and the second holder member are joined to each other by welding.

In the second image pickup lens unit, where the first holder member and the second holder member are joined to each other by welding, it is possible to avoid an increase in the number of components for holder assembly while ensuring stable holding of the lens. Additionally, since the first holder member is molded before the lens is positioned, there is no need to position and support the lens during molding of the first holder member. Since no space resulting from positioning of the lens is created around the first holder member, it is possible to avoid deterioration of dimensional accuracy and occurrence of visual defects. Also, since there is no need to create a flow path for molding components for joining the first holder member and the second holder member together, the image pickup lens unit can be prevented from increasing in size. Moreover, since the second holder member is welded to or adheres to the lens, it is possible to reliably stabilize the holding of the lens while reducing the size of the image pickup lens unit. Additionally, since the lens is positioned by bringing the positioning portion of the first holder member into contact with the surrounding of the second optical surface of the lens, the lens is precisely positioned with respect to the first holder member and the entire holder.

According to a specific aspect of the present invention, in the second image pickup lens unit, the first holder member has a correcting member that corrects an inclination of the lens.

According to another aspect of the present invention, in the first or second image pickup lens unit, the first holder member has a stop formed to surround an optical surface of the lens. Thus, since there is no need to insert a separately formed stop in proximity to the first holder member, it is possible to simplify the structure of the image pickup lens unit and the process of manufacturing the image pickup lens unit.

BRIEF DESCRIPTION OF DRAWINGS

FIG. 4(A) is a cross-sectional view illustrating formation of a first cavity in a manufacturing apparatus, and FIG. 4(B) is a cross-sectional view illustrating molding of a first holder member in the manufacturing apparatus.

FIG. 6 is a cross-sectional view illustrating how the insertion jig sets the lens in the first holder member.

FIG. 7 is a cross-sectional view illustrating removal of the insertion jig.

FIG. 8(A) is a cross-sectional view illustrating formation of a second cavity in the manufacturing apparatus, and FIG. 8(B) is a cross-sectional view illustrating molding of a second holder member.

FIG. 9(A) is a cross-sectional view illustrating final mold opening in the manufacturing apparatus, and FIG. 9(B) is a cross-sectional view illustrating how the image pickup lens unit is taken out.

DESCRIPTION OF EMBODIMENTS

First Embodiment

A structure of an image pickup lens unit and a method for manufacturing the same according to a first embodiment of the present invention will now be described with reference to the drawings.

Figure 1:
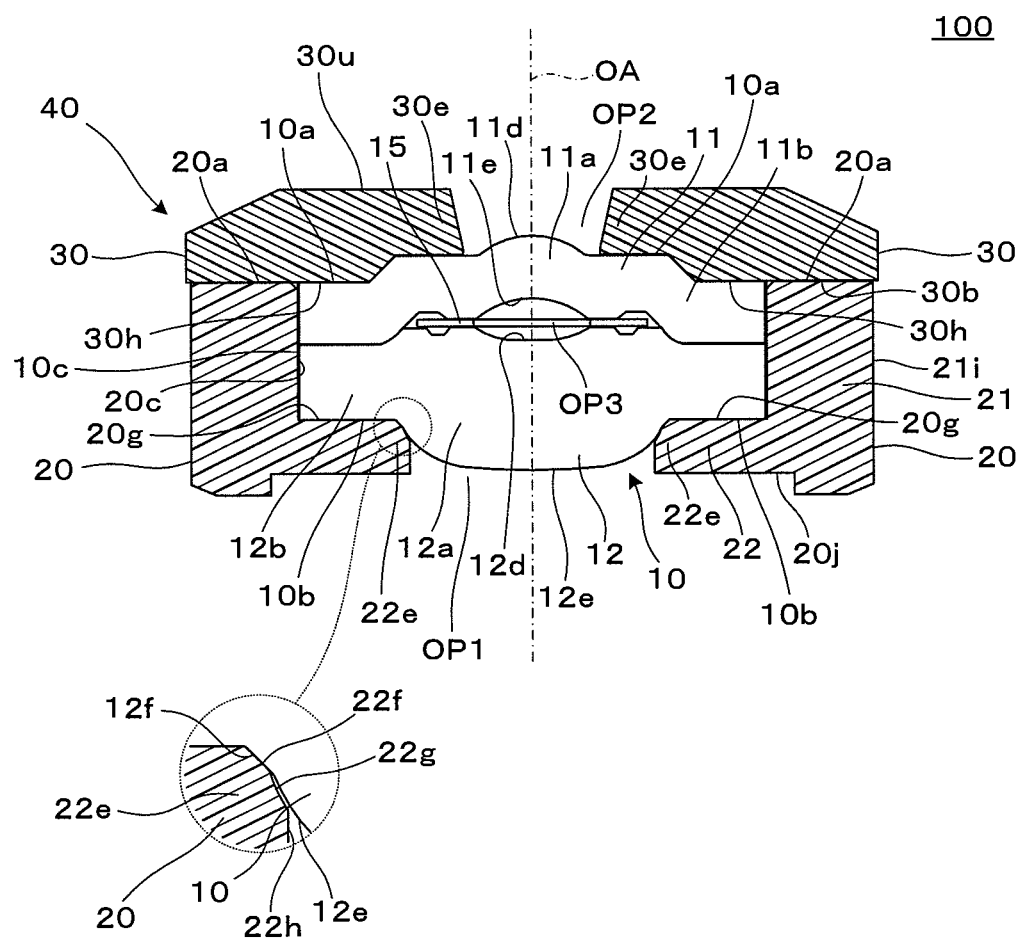
FIG. 1 is a lateral cross-sectional view illustrating a structure of an image pickup lens unit according to a first embodiment.
Figure 2A:
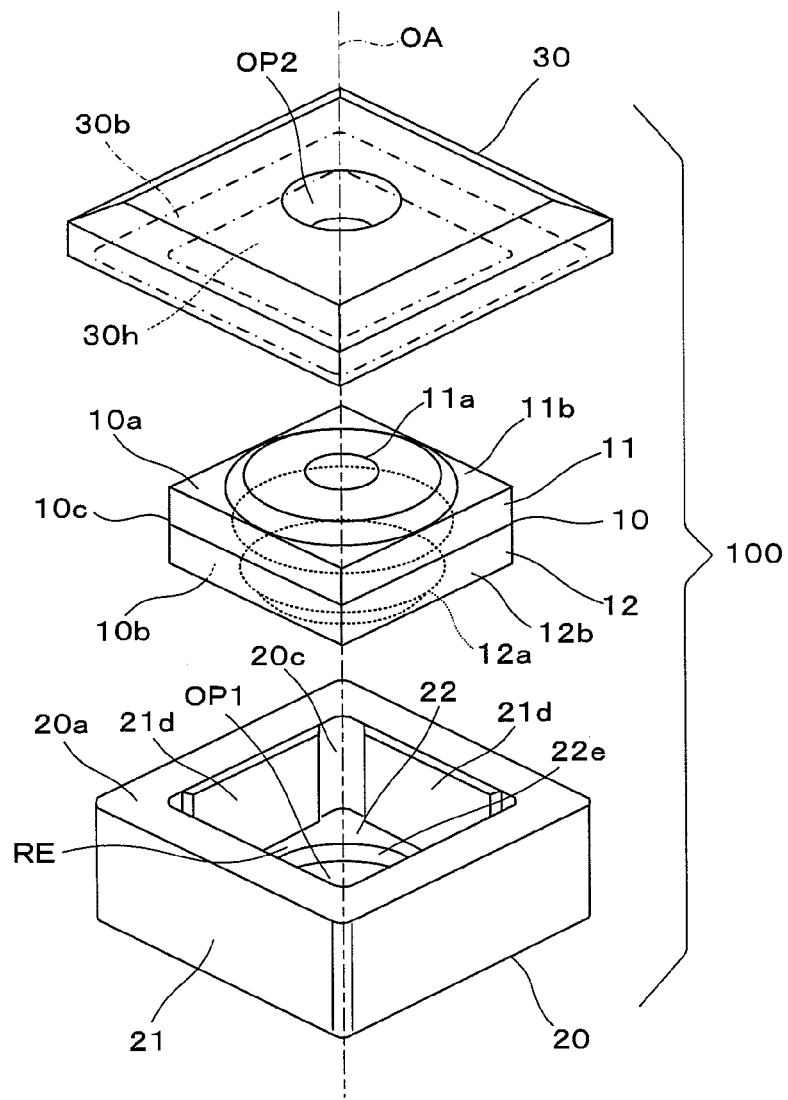
FIG. 2(A) is an exploded perspective view of the image pickup lens unit.
Figure 2B:
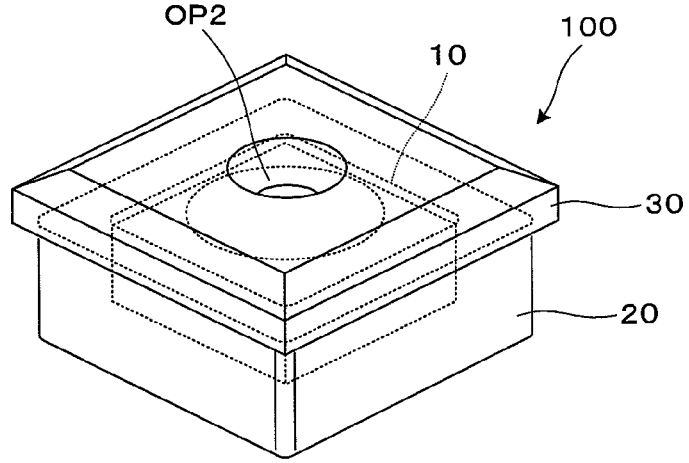
FIG. 2(B) is an external perspective view of the image pickup lens unit.

As illustrated in FIG. 1 and FIGS. 2(A) and 2(B), an image pickup lens unit 100 includes a lens 10 which is a laminated lens assembly, a first holder member 20 which is a square frame-like or box-like member, and a second holder member 30 which is a square lid-like member. The first holder member 20 and the second holder member 30 are connected together to form a holder 40 which is an integral component. The first holder member 20 and the second holder member 30 are connected by welding at a boundary surface extending in a direction perpendicular to an optical axis OA.

The lens 10 is, for example, cut out by dicing (or cutting process) from a lens wafer (wafer-like base material) on which many lenses are arranged. The lens 10 has a square outline in plan view, and has side surfaces which are like sides of a rectangular prism-like. The lens 10 includes a first lens element 11 on the object side, a second lens element 12 on the image side, and a stop 15 interposed between the first lens element 11 and the second lens element 12. The first lens element 11 includes a lens body 11a having a circular outline and located in a central portion around the optical axis OA, and a frame portion 11b having a square outline and extending around the lens body 11a. The lens body 11a is, for example, an aspheric lens portion and has a pair of optical surfaces 11d and 11e. The first optical surface 11d on the upper side and a first frame surface 10a (described below) form a first surface of the lens 10. The first lens element 11 is, for example, made of hardening resin having reflow heat resistance, but does not have to be entirely made of resin. The first lens element 11 may have a structure in which a glass plate is interposed between molded resin bodies. Alternatively, the first lens element 11 may be entirely made of glass. Examples of the hardening resin include thermosetting resin, photo-curable resin, and radiation curable resin.

The second lens element 12 also includes a lens body 12a having a circular outline and located in a central portion around the optical axis OA, and a frame portion 12b having a square outline and extending around the lens body 12a. The lens body 12a is, for example, an aspheric lens portion and has a pair of optical surfaces 12d and 12e. The second optical surface 12e on the lower side and a second frame surface 10b (described below) form a second surface of the lens 10. The second lens element 12 is, for example, made of hardening resin. The second lens element 12 may have a structure in which a glass plate is interposed between molded resin bodies, or may be entirely made of glass. An outer region of the frame portion 11b of the first lens element 11 and an outer region of the frame portion 12b of the second lens element 12 are bonded and secured together, for example, by an adhesive. Thus, the lens 10 including the lens elements 11 and 12 can be treated as a single lens. Like the frame portion 11b of the first lens element 11, the frame portion 12b (except the optical surface) of the second lens element 12 may have a stepped portion.

The lens 10 described above may be one formed by bonding the first lens element 11 and the second lens element 12 together, with a spacer interposed therebetween. Alternatively, the lens 10 may be one having a configuration in which the first lens element 11 of resin is formed on one side of a glass substrate and the second lens element 12 of resin is formed on the other side of the glass substrate.

The stop 15 is an annular band-like member having an opening OP3 in the center thereof. The stop 15 is secured by being sandwiched between an inner region of the frame portion 11b of the first lens element 11 and an inner region of the frame portion 12b of the second lens element 12. For example, the stop 15 is formed by a light-shielding metal plate or resin film, or is made of opaque photoresist material, such as black photoresist material. It is preferable that the stop 15 be also made of material having reflow heat resistance.

The first holder member 20 is made of thermoplastic resin having reflow heat resistance, such as liquid crystal polymer (LCP) or polyphthalamide (PPA). The first holder member 20 has a side wall 21 having a square tubular shape and a bottom 22 having a square plate-like shape. The entire first holder member 20 forms a recess RE in which the lens 10 is fitted and held. The side wall 21 faces four side faces 10c of the lens 10 and limits the movement of the lens 10 in a lateral direction perpendicular to the optical axis OA of the lens 10. The bottom 22 faces the second frame surface 10b on the lower side of the lens 10 and limits the movement of the lens 10 in a downward direction along the optical axis OA of the lens 10. As illustrated in FIG. 2(A), the side wall 21 has four stepped raised portions 21d on an inner periphery or inner side thereof. When the lens 10 is inserted into the recess of the first holder member 20, the stepped raised portions 21d come into contact with the side faces 10c of the lens 10 to guide the lens 10 to the inside. The bottom 22 has a circular opening OP1 in the center thereof. An edge portion 22e surrounding the opening OP1 serves as a stop. Thus, a part of the first holder member 20 serves as a stop. Therefore, to provide a stop on the surface of the lens 10, there is no need to form a stop separately from the holder 40. This can reduce the number of components.

In the present embodiment, small gaps are created between the side faces 10c of the lens 10 and the stepped raised portions 21d of the first holder member 20. As illustrated in a partial enlarged view, the lens 10 has a slope 12f between the optical surface 12e and the frame portion 12b. The edge portion 22e of the first holder member 20 has a slope portion 22f, a curved portion 22g, and a wall surface portion 22h. The slope portion 22f faces the slope 12f of the lens 10. The curved portion 22g faces and extends along, but is slightly spaced from, the optical surface 12e of the lens 10. The wall surface portion 22h extends in a direction away from the optical surface 12e of the lens 10. The lens 10 is slightly movable in a lateral direction. The edge portion 22e serves as a positioning portion for precisely positioning the lens 10 in a direction perpendicular to the optical axis OA. That is, when the lens 10 is inserted into the first holder member 20, the edge portion 22e comes into contact with the outer slope of the lens body 12a of the second lens element 12. Thus, the edge portion 22e serves to make the optical axis OA of the first holder member 20 precisely coincide with the optical axis OA of the lens 10.

With this structure, the lens 10 can be precisely aligned directly with the edge portion 22e serving as a stop of the lens 10.

The positioning of the lens 10 with respect to the first holder member 20 may be realized by creating a contact surface in the edge portion 22e of the first holder member 20, the contact surface facing an inclined portion of the lens 10, and bringing the contact surface into contact with the inclined portion of the lens 10. The inclined portion of the lens 10 is located within the optical surface 12e of the second lens element 12 (i.e., within a surface of the lens body 12a) but outside an effective region of the optical surface. In this case, a surface of the second lens element 12 where there is the optical surface 12e does not have to have an inclined portion, such as a slope, for positioning purposes. If the frame portion 12b of the second lens element 12 has a stepped portion, the lens 10 may be positioned by using a slope of the stepped portion. In this case, since the slope of the stepped portion is not located in the outer surface of the second lens element 12, the lens 10 can be accurately positioned during molding. Moreover, since the stepped portion is distant from the optical surface, the impact of positioning on optical performance can be minimized. The same applies to other embodiments and examples.

The first holder member 20 is formed by injection molding of resin (described in detail below).

The second holder member 30 is made of thermoplastic resin having reflow heat resistance (e.g., LCP or PPA) and has a square plate-like shape. The second holder member 30 faces the first frame surface 10a on the upper side of the lens 10 and limits the upward movement of the lens 10 along the optical axis OA. The second holder member 30 has a circular opening OP2 in the center thereof. An edge portion 30e surrounding the opening OP2 is disposed to shield the surrounding or periphery of the first optical surface 11d of the lens 10. Thus, the edge portion 30e serves as a kind of a stop. Although described in detail below, the second holder member 30 is formed by injection molding of resin after molding of the first holder member 20, and is directly joined to the first holder member 20 by resin welding. That is, an upper end surface 20a of the first holder member 20 and an outer rectangular surface 30b of the second holder member 30 are firmly welded together by heat of injection molding of the first holder member 20, and are directly joined together without using an adhesive. If both the first holder member 20 and the second holder member 30 are made of LCP, there are not many appropriate adhesives available. Therefore, by using welding as in the present embodiment, it is possible to reliably join the holder members 20 and 30 together.

An inner surface 20g of the bottom 22 of the first holder member 20 is in contact with the second frame surface 10b of the lens 10. The lens 10 is held in the first holder member 20 and only slightly biased downward. That is, the inner surface 20g and the second frame surface 10b are simply in contact without being bonded together.

On the other hand, an inner surface 30h on the upper side of the second holder member 30 adheres to or is welded to the first frame surface 10a of the lens 10. The first frame surface 10a (which may include upper parts of the side faces 10c, depending on the shape of the lens 10) of the lens 10 comes into contact with fluid resin or molten resin during injection molding of the second holder member 30. Therefore, if the surface of the lens 10 is made of resin, the surface (e.g., the first frame surface 10a) of the lens 10 is softened by heat of injection molding, and firmly welded and directly joined to the inner surface 30h of the second holder member 30 without using an adhesive. If the surface of the lens 10 is made of glass, the lens 10 is not welded to resin in the process of injection molding of resin. However, liquid resin is solidified while being in intimate contact with the first frame surface 10a of the lens 10. Therefore, since the inner surface 30h of the second holder member 30 adheres to the lens, the holder can be in intimate contact with the lens. With this configuration, positioning of the lens 10 can be freely performed at an early stage. After the lens 10 is mounted, the inner surface 30h of the second holder member 30 is welded to or adheres to the first frame surface 10a of the lens 10. Thus, the lens 10, the first holder member 20, and the second holder member 30 are all connected together, and stable positioning accuracy can be maintained.

In the image pickup lens unit 100 having the configuration described above, the first holder member 20 and the second holder member 30 are in proximity to or intimate contact with the surrounding of the lens 10. Therefore, it is possible to prevent the occurrence of ghosts and flares caused by incidence of light from the side faces of the lens. Substantially no unnecessary gaps are created on the side faces of the lens, and there is no need to provide a resin flow path for joining the holder members 20 and 30 together. Therefore, the wall thickness of the holder 40 can be reduced. Since the image pickup lens unit 100 can thus be made small in size, visual specifications required for the image pickup lens unit 100 to be included in final products, such as image pickup apparatuses, can be easily met. Moreover, since there are substantially no unnecessary gaps on the side faces of the lens, it is possible to suppress deterioration of dimensional accuracy caused by deformation that occurs during mold releasing.

With reference to a manufacturing procedure illustrated in FIG. 3, a method for manufacturing the image pickup lens unit 100 illustrated in FIG. 1 will now be described.

As illustrated in FIG. 4(A), a mold apparatus 50 includes a first mold 51 on the fixed side and a second mold 52 on the movable side. First, by appropriately operating the mold apparatus 50, the second mold 52 is moved to a first molding position, where mold clamping is performed. Thus, a first cavity CA1, which is a molding space for molding the first holder member 20, is formed between the first mold 51 and the second mold 52 (step S11 in FIG. 3). The first mold 51 has a first molding portion 61 protruding from a parting surface 51a, and the second mold 52 has a second molding portion 62 recessed from a parting surface 52a. When the molding portions 61 and 62 are fitted together, the first cavity CA1 is formed as a space sandwiched between the molding portions 61 and 62. The first molding portion 61 of the first mold 51 has transfer surfaces 61a and 61b for molding an outer surrounding 20i and a back surface 20j, respectively, of the first holder member 20 illustrated in FIG. 1. The second molding portion 62 of the second mold 52 has a transfer surface 62a for molding an inner surface 20c including the stepped raised portions 21d of the first holder member 20, and a transfer surface 62b for molding the inner surface 20g on the bottom side of the first holder member 20.

A slightly-tapered fitting member 61g stands along the perimeter of the first molding portion 61. An outer surface of the fitting member 61g is a fitting surface 61f. An inner surface of the second molding portion 62 is a slightly-tapered fitting surface 62f. By simply fitting the molding portions 61 and 62 together, the fitting surface 62f of the second molding portion 62 comes into contact with the fitting surface 61f of the fitting member 61g. Precise lateral alignment between the molding portions 61 and 62 is thus achieved. When the molding portions 61 and 62 are fitted together, an upper surface 61p of the fitting member 61g of the first molding portion 61 and a bottom surface 62p along the perimeter of the second molding portion 62 are in proximity to or intimate contact with each other. These surfaces 61p and 62p function like a parting line for molding the first holder member 20. For this molding, the first mold 51 on the fixed side and the second mold 52 on the movable side may be provided with taper lock pins. In this case, precise alignment can be achieved more accurately. At least one of the molding portions 61 and 62 is provided with a resin inlet (not shown). A heating mechanism for heating the molds 51 and 52 and a platen for applying pressure to the molds 51 and 52 from behind are also provided, but are not shown for ease of understanding.

Figure 3:
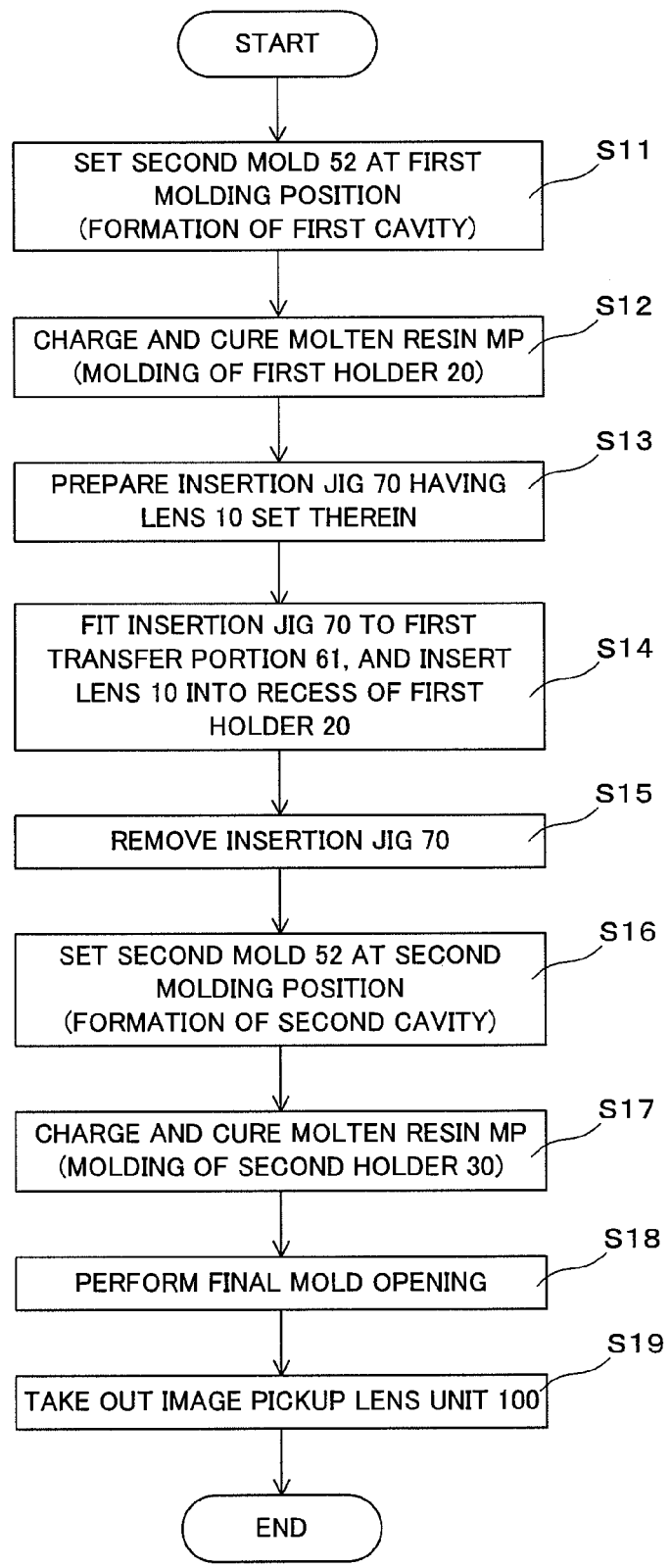
FIG. 3 is a flowchart illustrating a procedure for manufacturing the image pickup lens unit illustrated in FIG. 1.

Next, as illustrated in FIG. 4(B), fluid resin (molten resin) MP, which is a material of the first holder member 20, is charged into the first cavity CA1 and solidified by adjusting the temperature to mold the first holder member 20 (first molding step; step S12 in FIG. 3).

Figure 5:
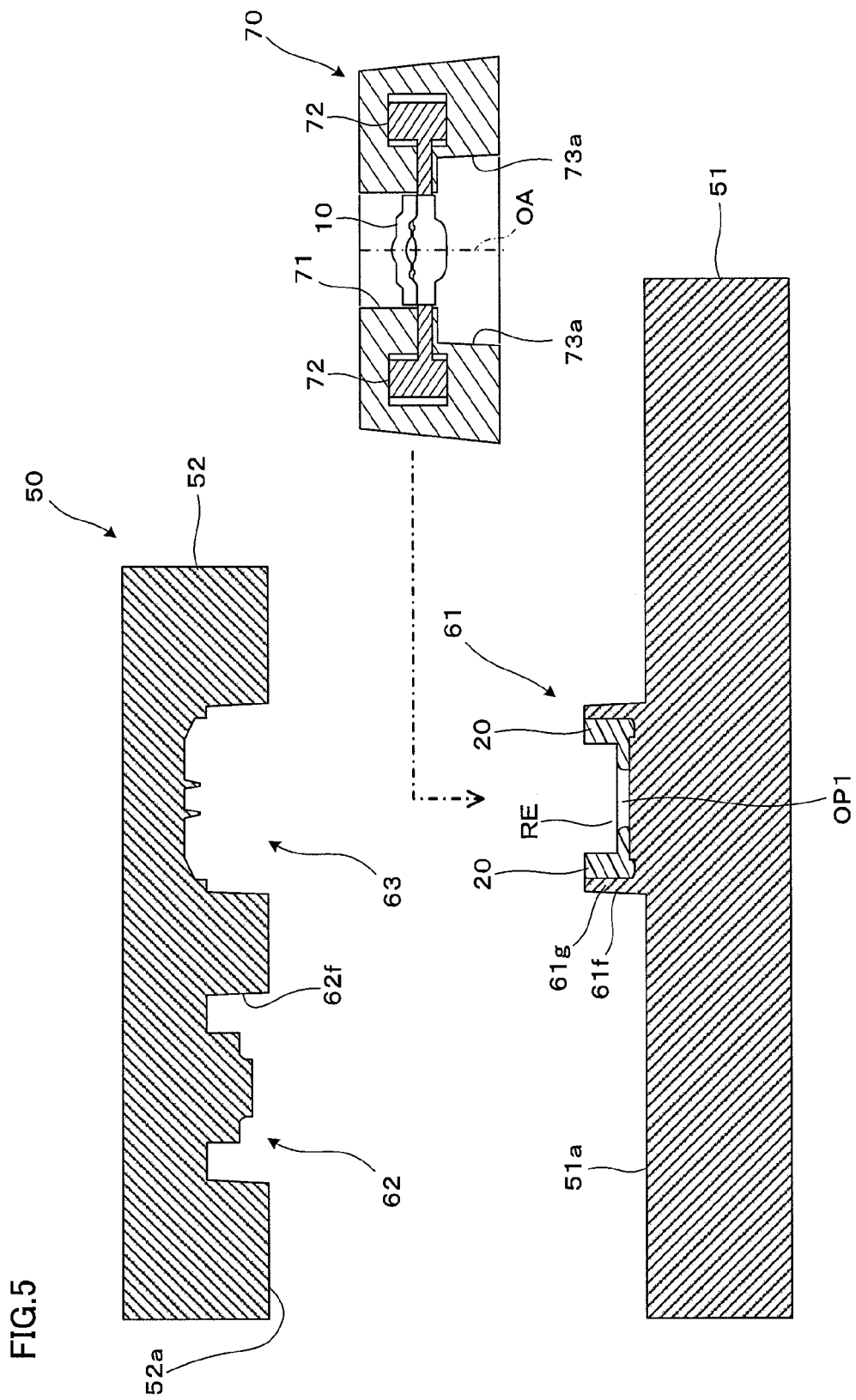
FIG. 5 is a cross-sectional view illustrating an insertion jig that holds a lens.

Next, as illustrated in FIG. 5, the second mold 52 is brought into a retracted state by mold opening which separates the second mold 52 from the first mold 51. At this point, the first holder member 20 is kept embedded and held on the first molding portion 61 of the first mold 51. In this state, an insertion jig 70 that holds the lens 10 is moved to a position above the first holder member 20 held by the first molding portion 61 (step S13 in FIG. 3).

The insertion jig 70 is an annular member that temporarily holds the lens 10 in a through hole 71 in the center thereof. The insertion jig 70 is remotely driven by a control drive unit (not shown) to convey the lens 10. The insertion jig 70 includes a fluid-driven chuck member 72 having a plurality of pressing members that move forward and backward with respect to the side faces 10c of the lens 10. By pressing the side faces 10c of the lens 10 from a plurality of directions, the insertion jig 70 can support the lens 10 in the center of the through hole 71 in a set state illustrated in the drawing, and can allow the lens 10 in the through hole 71 to move in the direction of the optical axis OA in a released state described below. The insertion jig 70 may use a mechanism that uses airflow to hold the lens 10 so as to prevent the lens 10 from falling off. In the lower part of the insertion jig 70, there is a tapered annular fitting surface 73a for fitting to the first mold 51.

Next, as illustrated in FIG. 6, while the second mold 52 is held in a retracted state, the insertion jig 70 is lowered to allow the fitting surface 73a inside the lower part of the insertion jig 70 to be fitted to the fitting surface 61f of the fitting member 61g of the first molding portion 61. This can make the optical axis OA of the lens 10 held by the insertion jig 70 substantially coincide with the optical axis OA of the first holder member 20 embedded in the first molding portion 61 of the first mold 51, so that the lens 10 can be accurately mounted into the first holder member 20. Then, when the insertion jig 70 is switched into a released state, the lens 10 released from the chuck member 72 is dropped and inserted into the recess RE of the first holder member 20 (inserting step; step S14 in FIG. 3). The lens 10 is moved downward while being guided by the stepped raised portions 21d of the side wall 21 of the first holder member 20 (see FIG. 1), supported on the bottom 22, and laterally positioned by the edge portion 22e of the bottom 22 (see FIG. 1).

Then, as illustrated in FIG. 7, the insertion jig 70 is removed from the first mold 51 (step S15 in FIG. 3).

Next, as illustrated in FIG. 8(A), the second mold 52 is moved to a second molding position, where mold clamping is performed. Thus, a second cavity CA2, which is a molding space for molding the second holder member 30, is formed between the first mold 51 and the second mold 52 (step S16 in FIG. 3). The second mold 52 has a third molding portion 63 facing the first molding portion 61 and recessed from the parting surface 52a. The molding portions 61 and 63 are fitted together in an aligned state. An inner surface of the third molding portion 63 of the second mold 52 is also a slightly-tapered fitting surface 63f. Therefore, by simply fitting the third molding portion 63 and the first molding portion 61 together, the fitting surface 63f of the third molding portion 63 comes into contact with the fitting surface 61f of the fitting member 61g of the first molding portion 61, so that the third molding portion 63 and the first molding portion 61 can be accurately aligned. Thus, when the image pickup lens unit 100 is finally completed, the optical axis OA of the second holder member 30, the optical axis OA of the first holder member 20, and the optical axis OA of the lens 10 can coincide. The third molding portion 63 of the second mold 52 has a transfer surface 63a for molding an upper surface 30u (see FIG. 1) of the second holder member 30 illustrated in FIG. 1. The second cavity CA2 serving as a molding space is formed between the transfer surface 63a on the upper side and the upper end surface 20a of the first holder member 20 and the first frame surface 10a of the lens 10 on the lower side. The third molding portion 63 has a fixing member 63c that secures the lens 10 by coming into contact with the lens 10 to surround the outer region of the optical surface 11d of the lens 10. The fixing member 63c not only forms part of the transfer surface 63a on the side of the second cavity CA2, but also prevents the fluid resin (molten resin) MP from flowing into a space SP adjacent to the optical surface 11d of the lens 10. When the second cavity CA2 is formed by mold clamping, the fixing member 63c comes into contact with the innermost part of the frame portion 11b of the lens 10 to gently press the lens 10 downward. Thus, the fixing member 63c stabilizes the lens 10 within the first holder member 20 to prevent the lens 10 from generation of a play (being loosened). Since the lens 10 is supported by the first holder member 20 made of resin and having some elasticity, it is possible to reliably prevent the lens 10 from being damaged by being directly pressed by the fixing member 63c. The closer the position at which the fixing member 63c presses the lens 10 is to the first optical surface 11d and the thinner the fixing member 63c, the closer the opening of the second holder member 30 obtained by molding becomes to the optical surface and thus, the more the light-shielding function of the stop can be improved. If there is no impact on optical performance, the fixing member 63c may have a contact surface facing an inclined portion within the optical surface of the first lens element 11 (i.e., within a surface of the lens body 11a) but outside the effective region, so as to secure the lens 10 by bringing this contact surface into contact with the inclined portion.

The slightly-tapered fitting surface 63f corresponding to the fitting surface 61f of the fitting member 61g of the first molding portion 61 is provided as the inner surface of the third molding portion 63. Therefore, by simply fitting the third molding portion 63 and the first molding portion 61 together, the fitting surface 63f comes into contact with the fitting surface 61f of the fitting member 61g, so that precise lateral alignment between the molding portions 62 and 63 can be achieved. Thus, when the image pickup lens unit 100 is finally completed, the optical axis OA of the second holder member 30, the optical axis OA of the first holder member 20, and the optical axis OA of the lens 10 can coincide. When the molding portions 62 and 63 are fitted together, the upper surface 61p along the perimeter of the first molding portion 61 and a bottom surface 63p along the perimeter of the third molding portion 63 are in proximity to or intimate contact with each other. These surfaces 61p and 63p function like a parting line for molding the second holder member 30. Thus, the third molding portion 63 can be precisely aligned with the first holder member 20.

Next, as illustrated in FIG. 8(B), the fluid resin (molten resin) MP, which is a material of the second holder member 30, is charged into the second cavity CA2 and solidified by adjusting the temperature to mold the second holder member 30 (second molding step; step S17 in FIG. 3). Thus, the image pickup lens unit 100 is completed in which the lens 10 is sandwiched and secured between the first holder member 20 and the second holder member 30. By preventing the fluid resin MP from flowing into the space SP, the fixing member 63c of the third molding portion 63 serves to form the opening OP2 in the second holder member 30.

Next, as illustrated in FIG. 9(A), the second mold 52 is brought into a retracted state by mold opening which separates the second mold 52 from the first mold 51 (step S18 in FIG. 3). Then as illustrated in FIG. 9(B), the finished image pickup lens unit 100 can be taken out of the first mold 51 by ejecting and mold releasing the image pickup lens unit 100 using ejector pins (not shown) in the first mold 51 (step S19 in FIG. 3).

In the image pickup lens unit 100 of the first embodiment, additional molding is performed, in the second molding step, on the first holder member 20 having the lens 10 inserted therein. Thus, the second holder member 30 is molded which prevents the lens 10 from falling off and is welded to the first holder member 20. It is thus possible to reliably perform molding of the second holder member 30 and joining of the second holder member 30 to the first holder member 20 at the same time, and avoid an increase in the number of components for holder assembly. Thus, it is possible to avoid an increase in size of a system for assembling the image pickup lens unit 100. Since the second holder member 30 is molded with the lens 10 fitted in the first holder member 20, it is possible to avoid deterioration of dimensional accuracy caused by the presence of a large positioning shape remaining in the first holder member 20. The lens 10 is positioned by the first holder member 20 when the lens 10 is inserted into the first holder member 20. Therefore, it is not necessary either to install an image recognition apparatus or add a positioning mechanism to the mold apparatus 50, and the accuracy of the apparatus for manufacturing the image pickup lens unit 100 can be easily improved. A stop (edge portion 22e) is formed in advance in the bottom 22 of the first holder member 20. Thus since it is not necessary, during assembly of the image pickup lens unit 100, to insert a separately formed stop in proximity to the first holder member 20, the manufacturing process can be simplified.

In the example described above, the fitting surfaces 61f, 62f, and 63f of the molding portions 61, 62, and 63 are used for alignment of the first molding portion 61 with the second and third molding portions 62 and 63. Alternatively, similar alignment can be performed using taper lock pins provided on the molds 51 and 52 separately from the molding portions 61, 62, and 63.

In the example described above, the lens 10 is a cemented integral lens assembly. Although this can simplify the process of insertion and positioning of the lens 10 in the mold, the first lens element 11, the second lens element 12, and the stop 15 may be separate from one another. When a plurality of lens elements and a stop are separate from one another, the technique of a second embodiment (described below) may be used in which the lens 10 and the first holder member 20 are positioned by bringing the side faces 10c of the lens 10 into contact with the stepped raised portions 21d of the first holder member 20. In this case, by repeating steps S13 to S15 in FIG. 3 multiple times, the first lens element 11 and the second lens element 12 are sequentially inserted by the insertion jig 70 into the recess RE of the first holder member 20, and are positioned in the first holder member 20 using the inner wall surface of the first holder member 20. In the present embodiment, as described above, small gaps are created between the side faces 10c of the lens 10 and the stepped raised portions 21d of the first holder member 20, and the edge portion 22e serves to make the optical axis OA of the first holder member 20 precisely coincide with the optical axis OA of the lens 10. In this case, the first lens element 11, the second lens element 12, and the stop 15 may have raised and recessed portions to realize positioning between them. Then, after steps S13 to S15 in FIG. 3 are performed to place and position the second lens element 12 on the first holder member 20, the stop 15 and the first lens element 11 are sequentially stacked on the first holder member 20 and positioned by the raised and recessed portions described above. Then, step S16 and the following steps in FIG. 3 are performed.

In the example described above, the first holder member 20 and the second holder member 30 are made of reflow heat-resistant material. However, the holder members 20 and 30 do not necessarily have to be made of the same material. By using fluid resins MP having different solidification temperatures for molding the holder members 20 and 30, the welding state of the holder members 20 and 30 can be adjusted.

Second Embodiment

A method for manufacturing an image pickup lens unit according to a second embodiment will now be described. Note that the method for manufacturing the image pickup lens unit according to the second embodiment is a modification of the method for manufacturing the image pickup lens unit 100 according to the first embodiment. Unless otherwise noted, the manufacturing method of the second embodiment is the same as that of the first embodiment.

Figure 10:
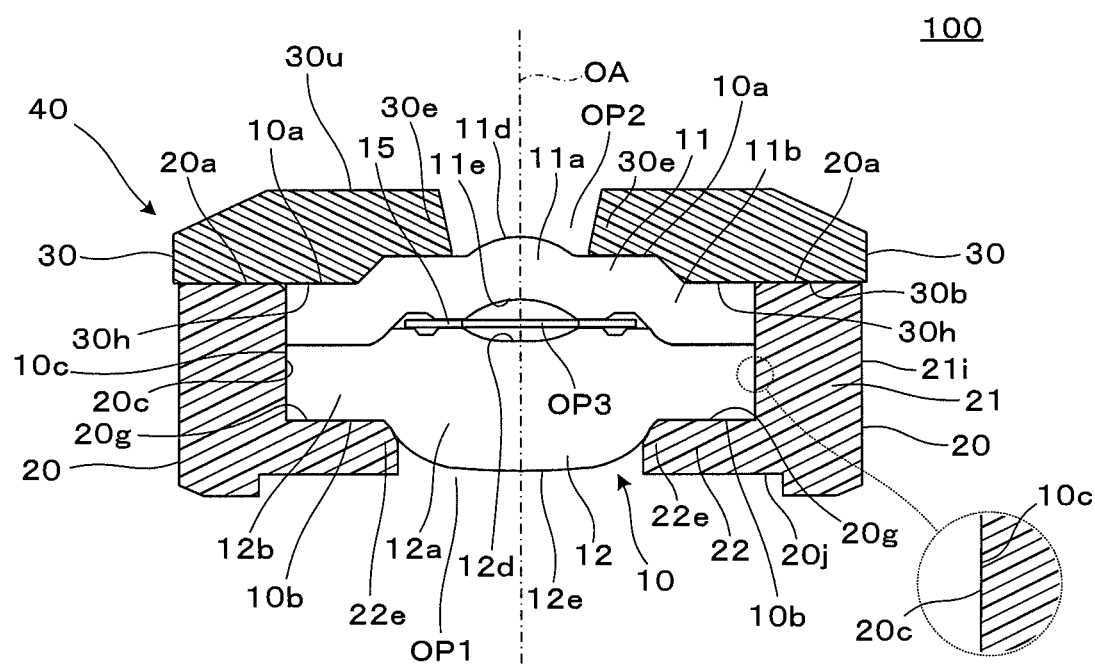
FIG. 10 is a cross-sectional view illustrating an image pickup lens unit according to a second embodiment.

In the present embodiment, as illustrated in FIG. 10, there are no small gaps between the side faces 10c of the lens 10 and the stepped raised portions 21d or inner surface 20c of the first holder member 20. The lens 10 and the first holder member 20 are positioned by bringing the outer surrounding of the lens 10 into contact with the stepped raised portions 21d of the first holder member. In this case, the stepped raised portions 21d forming the inner wall surface of the first holder member 20 serves to make the optical axis OA of the first holder member 20 precisely coincide with the optical axis OA of the lens 10.

When the lens is to be positioned by the stepped raised portions 21d of the first holder member 20, it is important to accurately process the transfer surface 62a of the second molding portion 62 of the second mold 52.

Third Embodiment

A method for manufacturing an image pickup lens unit according to a third embodiment will now be described. Note that the method for manufacturing the image pickup lens unit according to the third embodiment is a modification of the method for manufacturing the image pickup lens unit 100 according to the first embodiment. Unless otherwise noted, the manufacturing method of the third embodiment is the same as that of the first embodiment.

Figure 11:
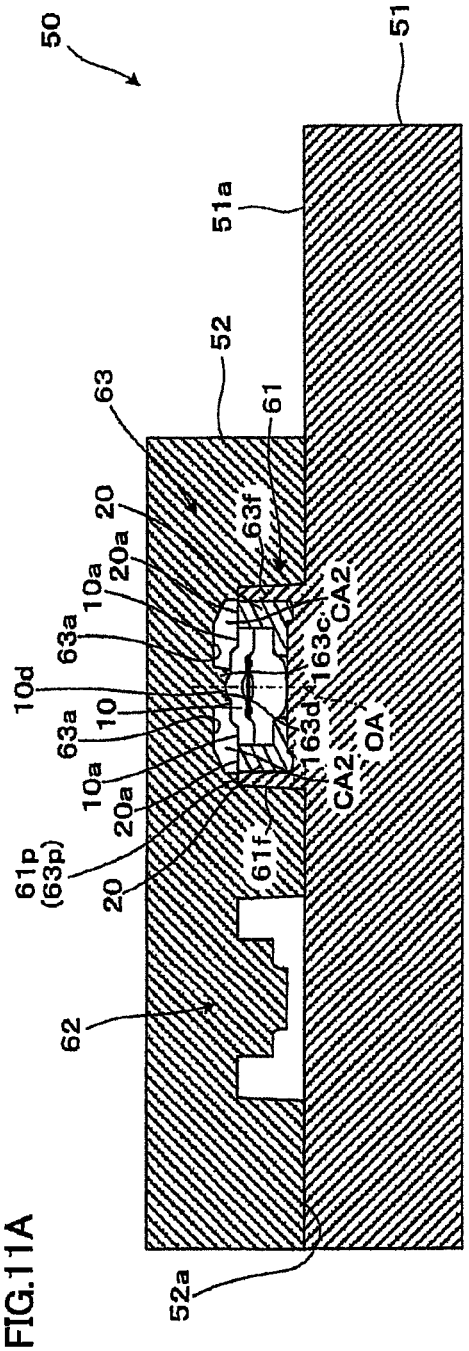
FIGS. 11(A) and 11(B) are cross-sectional views illustrating a manufacturing apparatus for manufacturing an image pickup lens unit according to a third embodiment.

As illustrated in FIGS. 11(A) and 11(B), in the second mold 52 for manufacturing the image pickup lens unit 100, a fixing member 163c inside the third molding portion 63 is a circular columnar protrusion. An end surface 163d serving as a contact surface of the fixing member 163c has the same or substantially the same curvature as the optical surface 11d of the lens 10. The end surface 163d is configured to come into surface contact with the optical surface 11d of the lens 10. Thus, since the end surface of the fixing member 163c comes into intimate contact with the optical surface 11d of the lens 10, the fluid resin MP can be prevented from leaking to the optical surface 11d. As a result, the opening OP2 can be formed in the second holder member 30. Since the lens 10 that comes into contact with the fixing member 163c is supported by the first holder member 20 made of resin and having some elasticity, the lens 10 can be prevented from being damaged by the fixing member 163c. If it is difficult to bring the optical surface 11d and the fixing member 163c into intimate contact over the entire area, the fixing member 163c may be brought into surface contact with at least a region outside the effective region of the optical surface 11d.

Fourth Embodiment

An image pickup lens unit and a method for manufacturing the same according to a fourth embodiment will now be described. Note that the image pickup lens unit and the method for manufacturing the same according to the fourth embodiment are modifications of the image pickup lens unit 100 and the method for manufacturing the same according to the first embodiment. Unless otherwise noted, the image pickup lens unit and the method for manufacturing the same according to the fourth embodiment are the same as those of the first embodiment.

Figure 12:
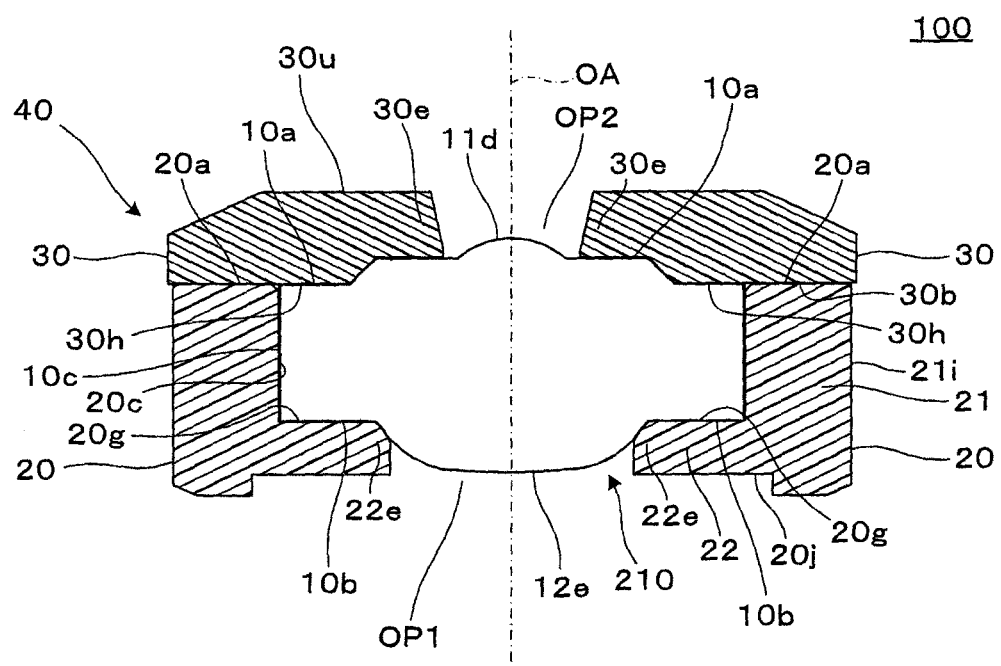
FIG. 12 is a cross-sectional view illustrating an image pickup lens unit according to a fourth embodiment.

As illustrated in FIG. 12, a lens 210 is a single lens component made of resin, glass, or a combination of both. In this case, the manufacture of the lens 210 is relatively simple. The lens 210 is held by the holder 40 which is an integrated component formed by welding. The shape of the holder 40 in FIG. 12 is not limited to that illustrated in FIG. 1, and may be that illustrated in any of FIGS. 14 to 16, FIG. 17(A), FIG. 18(B), and FIG. 19(B).

If the lens 210 is made of resin, the lens 210 may also be formed by the mold apparatus 50.

Figure 13:
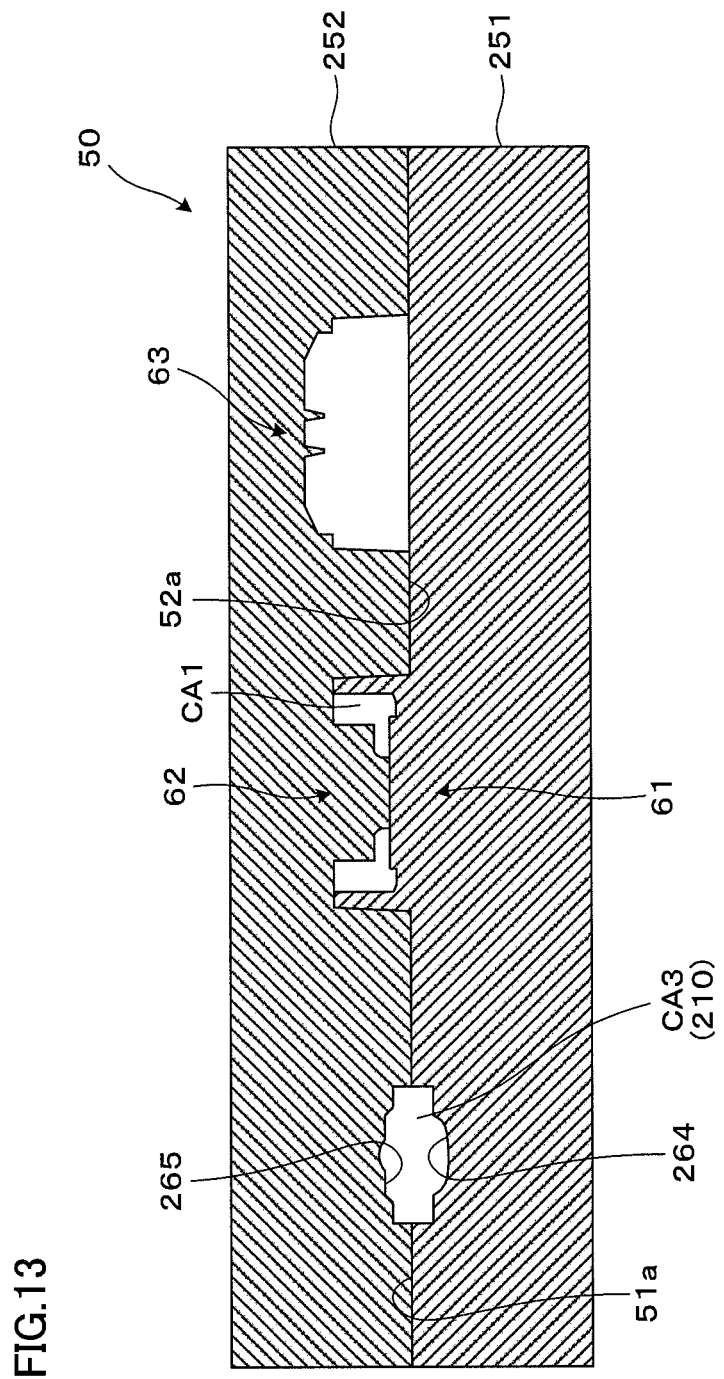
FIG. 13 is a cross-sectional view illustrating a manufacturing apparatus for manufacturing the image pickup lens unit according to the fourth embodiment.

FIG. 13 illustrates a method for manufacturing the lens 210. The mold apparatus 50 includes a first mold 251 on the fixed side and a second mold 252 on the movable side. The first mold 251 has the first molding portion 61 for molding the first holder member, and a fourth molding portion 264 for molding the lens. The second mold 252 has the second molding portion 62 for molding the first holder member 20, the third molding portion 63 for molding the second holder member 30, and a fifth molding portion 265 for molding the lens. At least one of the first molding portion 61 and the second molding portion 62, at least one of the fourth molding portion 264 and the fifth molding portion 265, and the third molding portion 63 are provided with resin inlets (not shown). The configurations of the first molding portion 61 to the third molding portion 63 will not be described in detail here, as they are the same as those of the first embodiment.

The second mold 252 is moved to a molding position, where the fourth molding portion 264 and the fifth molding portion 265 face each other and mold clamping is performed. Thus, a third cavity CA3, which is a molding space for molding the lens 210, is formed by the fourth molding portion 264 and the fifth molding portion 265 between the first mold 251 and the second mold 252. The molding position described above is also a position (first molding position) for molding the first holder member. Simultaneously with the formation of the third cavity CA3 for molding the lens, the first cavity CA1 for molding the first holder member is formed. The lens 210 is molded by charging resin into the cavity CA3 for molding the lens and solidifying the resin. The first holder member 20 is molded by charging resin into the cavity CA1 and solidifying the resin.

Next, while the lens 210 is held in the second mold 252, the second mold 252 is moved to a position above the first holder member 20 in the first mold 251. Then, the lens 210 is released from the second mold 252 using an eject mechanism (not shown) and is fitted into the recess RE of the first holder member 20 held by the first molding portion 61. Then, the second mold 252 is moved to a position where the third molding portion 63 of the second mold 252 faces the first molding portion 61 of the first mold 251, and the first molding portion 61 and the third molding portion 63 are fitted together (i.e., the second mold 252 is set at a second molding position). After mold clamping, the second holder member 30 is molded by charging resin into the cavity CA2 and solidifying the resin. Thus, the second holder member 30 and the first holder member 20 are welded together to complete the image pickup lens unit 100 in which the lens 210 is held and secured in the holder 40. By charging resin into the cavity CA3 simultaneously with the molding of the first holder member 20, another lens 210 can be molded in parallel with the molding of the first holder member 20. By repeating the process described above, many image pickup lens units 100 can be manufactured in a short time. Also, since a molding space for molding the lens 210 is provided in an area different from the molding spaces for molding the holder 40 in the molds 251 and 252, it is possible to save space on the apparatus for manufacturing the image pickup lens unit 100.

Fifth Embodiment

An image pickup lens unit and a method for manufacturing the same according to a fifth embodiment will now be described. Note that the image pickup lens unit and the method for manufacturing the same according to the fifth embodiment are modifications of the image pickup lens unit 100 and the method for manufacturing the same according to the first embodiment. Unless otherwise noted, the image pickup lens unit and the method for manufacturing the same according to the fifth embodiment are the same as those of the first embodiment.

Figure 14:
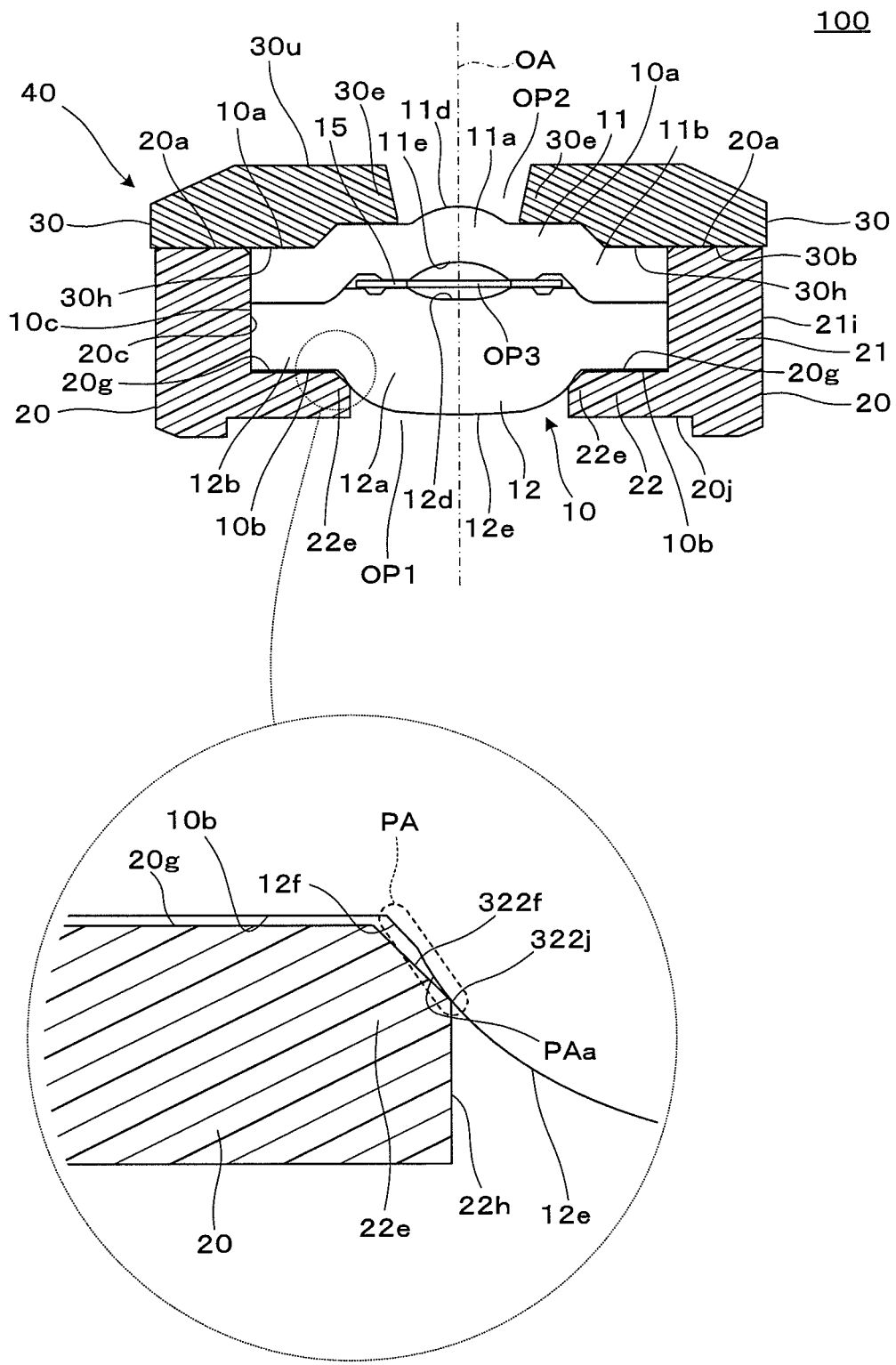
FIG. 14 is a lateral cross-sectional view illustrating a structure of an image pickup lens unit according to a fifth embodiment.

As illustrated in FIG. 14, the image pickup lens unit 100 according to the fifth embodiment includes the lens 10 which is a laminated lens assembly, the first holder member 20 which is a square frame-like or box-like member, and the second holder member 30 which is a square lid-like member.

In the present embodiment, small gaps are created between the side faces 10c of the lens 10 and the stepped raised portions 21d of the side wall 21 of the first holder member 20. A small gap is also created between the second frame surface 10b of the lens 10 and the inner surface 20g of the bottom 22 of the first holder member 20. As illustrated in a partial enlarged view, the edge portion 22e of the first holder member 20 has a tapered inclined portion 322f facing a surrounding (or periphery) PA outside the effective region of the second optical surface 12e of the lens 10, and the wall surface portion 22h having a tubular shape and parallel to the optical axis OA of the lens 10. An edge 322j having an obtuse angle is formed at the boundary of the inclined portion 322f and the wall surface portion 22h. The edge 322j positions an outer-edge annular region PAa of the second optical surface 12e while linearly supporting the outer-edge annular region PAa (i.e., while supporting the outer-edge annular region PAa by line contact therewith). Thus, the edge portion 22e serves not only as a stop, but also as a positioning portion for precisely positioning the lens 10 in a direction perpendicular to the optical axis OA, the lens 10 being slightly movable in the lateral direction. That is, when the lens 10 is inserted into the first holder member 20, the edge portion 22e comes into contact with an outer slope of the outer-edge annular region PAa of the lens body 12a of the second lens element 12. Thus, the edge portion 22e serves to make the optical axis OA of the first holder member 20 precisely coincide with the optical axis OA of the lens 10. With this structure, the lens 10 can be precisely aligned directly with the edge portion 22e serving as a stop.

A tapered slope 12f is provided between the second optical surface 12e and the second frame surface 10b of the lens 10. The slope 12f is an outside annular region adjacent to and outside the outer-edge annular region PAa of the second optical surface 12e. In the present specification, both the outer-edge annular region PAa and the slope 12f are included in the surrounding PA of the second optical surface 12e. In the present embodiment, however, the slope 12f may not be provided as it has no particular function.

As described above, small gaps are created between the side faces 10c of the lens 10 and the side wall 21 of the first holder member 20, and a small gap is also created between the second frame surface 10b of the lens 10 and the bottom 22 of the first holder member 20. On the other hand, the inner surface 30h of the second holder member 30 adheres to or is welded to the first frame surface 10a of the lens 10. If the surface of the lens 10 is made of resin, the surface (e.g., the first frame surface 10a) of the lens 10 is softened by heat of injection molding, and firmly welded and directly joined to the inner surface 30h of the second holder member 30 without using an adhesive. If the surface of the lens 10 is made of glass, the lens 10 is not welded to resin in the process of injection molding of resin. However, liquid resin is solidified while being in intimate contact with the first frame surface 10a of the lens 10. Therefore, since the inner surface 30h of the second holder member 30 adheres to the lens 10, the holder 40 can be in intimate contact with the lens 10.

A method for manufacturing the image pickup lens unit 100 illustrated in FIG. 14 is the same as that for manufacturing the image pickup lens unit 100 of the first embodiment. That is, the image pickup lens unit 100 is made by following the steps illustrated in FIG. 3 using the mold apparatus 50 illustrated in FIG. 4(A). Specifically, the processes illustrated in FIGS. 4(A) and 4(B), FIGS. 5 to 7, FIGS. 8(A) and 8(B), and FIGS. 9(A) and 9(B) are performed.

In the image pickup lens unit 100 of the fifth embodiment, additional molding is performed, in the second molding step, on the first holder member 20 having the lens 10 inserted therein. Thus, the second holder member 30 that prevents the lens 10 from falling off is molded such that it is welded to the first holder member 20. It is thus possible to reliably perform molding of the second holder member 30 and joining of the second holder member 30 to the first holder member 20 at the same time, and avoid an increase in the number of components for holder assembly. Thus, it is possible to avoid an increase in size of a system for assembling the image pickup lens unit 100. In particular, since the second holder member 30 and the first holder member 20 can be connected together by molding the second holder member 30, it is possible to avoid deterioration of dimensional accuracy caused by the presence of a large positioning shape remaining in the first holder member 20. The second optical surface 12e of the lens 10 is positioned by the edge portion 22e of the first holder member 20 when the lens 10 is inserted into the first holder member 20. Therefore, it is not necessary either to install an image recognition apparatus or add a positioning mechanism to the mold apparatus 50, and the accuracy of the apparatus for manufacturing the image pickup lens unit 100 can be easily improved. A stop (edge portion 22e) is formed in advance in the bottom 22 of the first holder member 20. Thus since it is not necessary, during assembly of the image pickup lens unit 100, to insert a separately formed stop in proximity to the first holder member 20, the manufacturing process can be simplified.

Although the lens 10 is a cemented integral lens assembly in the example described above, the first lens element 11, the second lens element 12, and the stop 15 may be separate from one another as in the first embodiment. In the present embodiment, small gaps are created between the side faces 10c of the lens 10 and the stepped raised portions 21d of the first holder member 20, and the edge portion 22e serves to make the optical axis OA of the first holder member 20 precisely coincide with the optical axis OA of the lens 10. In this case, the first lens element 11, the second lens element 12, and the stop 15 may have raised and recessed portions to realize positioning between them in advance. Then, after steps S13 to S15 in FIG. 3 are performed to place and position the second lens element 12 on the first holder member 20, the stop 15 and the first lens element 11 are sequentially stacked on the first holder member 20 and positioned by the raised and recessed portions described above. Then, step S16 and the following steps in FIG. 3 are performed.

Sixth Embodiment

An image pickup lens unit and a method for manufacturing the same according to a sixth embodiment will now be described. Note that the image pickup lens unit and the method for manufacturing the same according to the sixth embodiment are modifications of the image pickup lens unit 100 and the method for manufacturing the same according to the fifth or first embodiment. Unless otherwise noted, the image pickup lens unit and the method for manufacturing the same according to the sixth embodiment are the same as those of the fifth or first embodiment.

Figure 15:
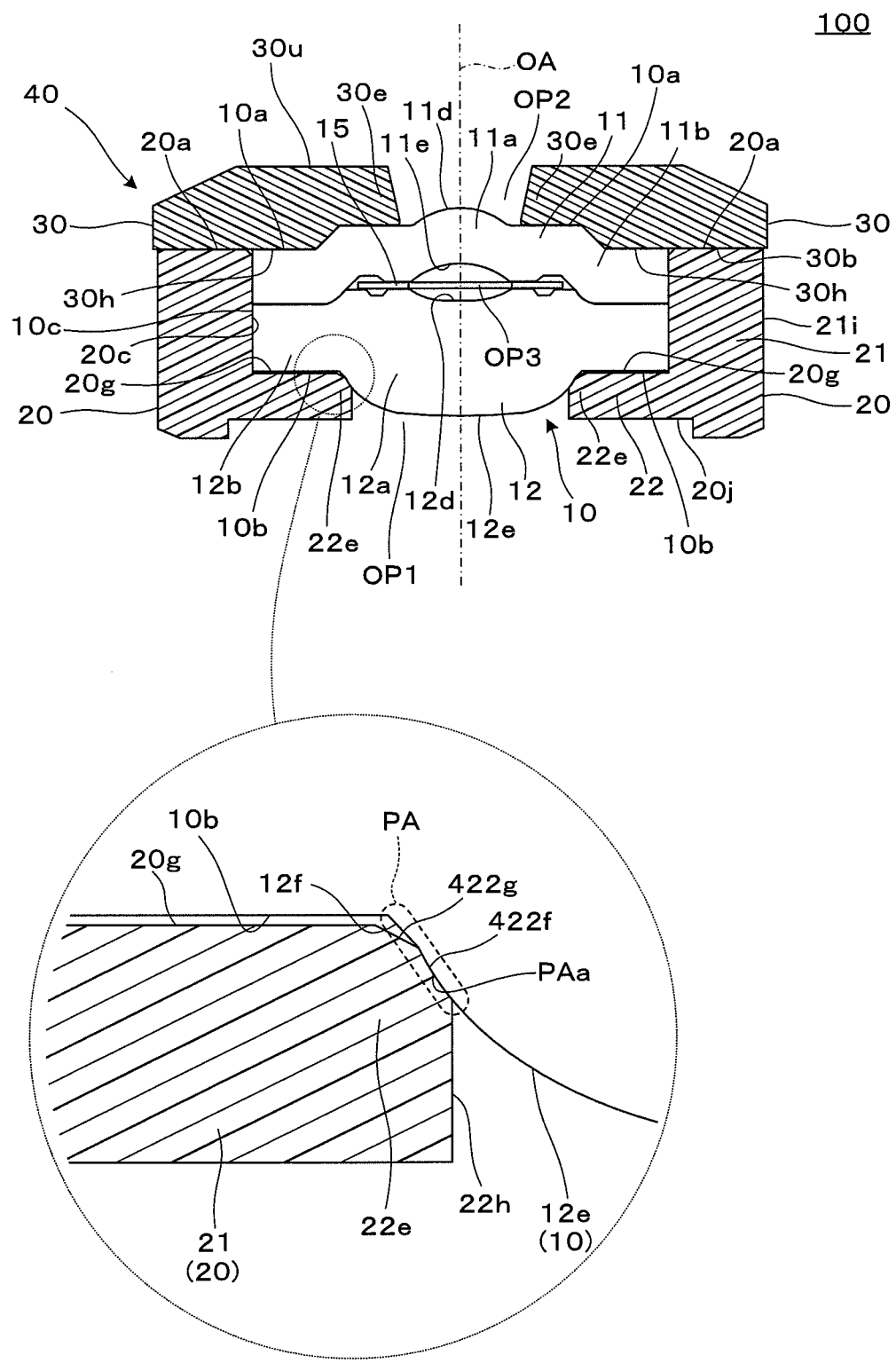
FIG. 15 is a cross-sectional view illustrating an image pickup lens unit according to a sixth embodiment.

As illustrated in a partial enlarged view in FIG. 15, the edge portion 22e of the first holder member 20 has a tapered slope portion 422g facing the slope 12f of the lens 10, a tapered inclined portion 422f facing the outer-edge annular region PAa of the second optical surface 12e of the lens 10, and the wall surface portion 22h having a tubular shape and parallel to the optical axis OA of the lens 10. The slope portion 422g of the edge portion 22e and the slope 12f of the lens 10 are spaced from each other. The inclined portion 422f has a curved shape along the second optical surface 12e of the lens 10. By coming into contact with the outer-edge annular region PAa of the second optical surface 12e, the inclined portion 422f positions the surrounding PA of the second optical surface 12e while supporting the surrounding PA by surface contact therewith. Thus, the edge portion 22e serves not only as a stop, but also as a positioning portion for precisely positioning the lens 10 in a direction perpendicular to the optical axis OA.

Seventh Embodiment

An image pickup lens unit and a method for manufacturing the same according to a seventh embodiment will now be described. Note that the image pickup lens unit and the method for manufacturing the same according to the seventh embodiment are modifications of the image pickup lens unit 100 and the method for manufacturing the same according to the fifth or first embodiment. Unless otherwise noted, the image-pickup lens unit and the method for manufacturing the same according to the seventh embodiment are the same as those of the fifth or first embodiment.

Figure 16:
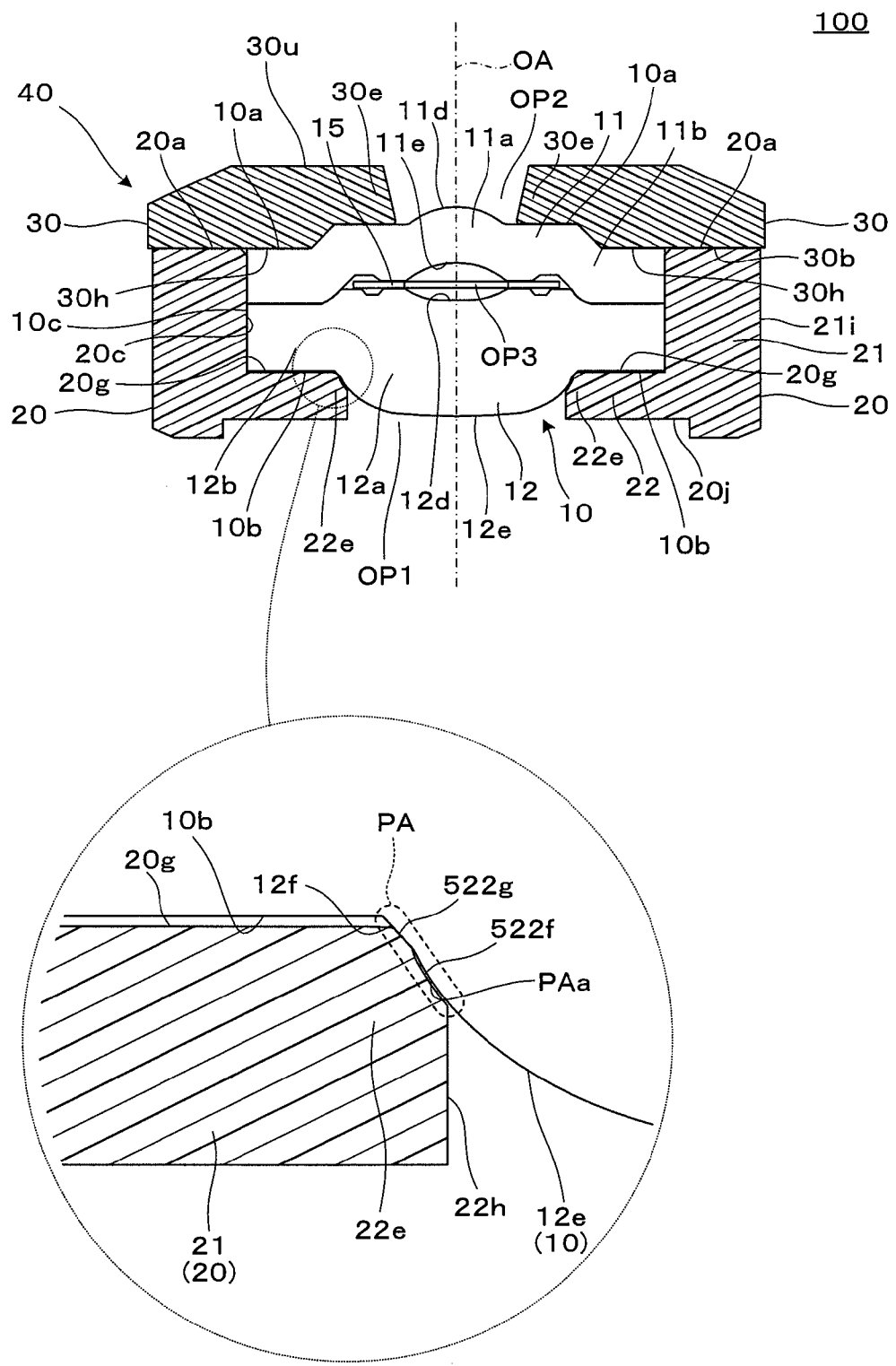
FIG. 16 is a cross-sectional view illustrating an image pickup lens unit according to a seventh embodiment.

As illustrated in FIG. 16, the edge portion 22e of the first holder member 20 has a tapered slope portion 522g facing the slope 12f of the lens 10, a tapered inclined portion 522f facing the outer-edge annular region PAa of the second optical surface 12e of the lens 10, and the wall surface portion 22h having a tubular shape and parallel to the optical axis OA of the lens 10. The inclined portion 522f of the edge portion 22e and the outer-edge annular region PAa of the second optical surface 12e are spaced from each other. The slope portion 522g has a shape along the slope 12f of the lens 10. By coming into contact with the slope 12f of the lens 10, the slope portion 522g positions the surrounding PA of the second optical surface 12e while supporting the surrounding PA by surface contact therewith. Thus, the edge portion 22e serves not only as a stop, but also as a positioning portion for precisely positioning the lens 10 in a direction perpendicular to the optical axis OA.

Eighth Embodiment

An image pickup lens unit and a method for manufacturing the same according to an eighth embodiment will now be described. Note that the image pickup lens unit and the method for manufacturing the same according to the eighth embodiment are modifications of the image pickup lens unit 100 and the method for manufacturing the same according to the fifth or first embodiment. Unless otherwise noted, the image pickup lens unit and the method for manufacturing the same according to the eighth embodiment are the same as those of the fifth or first embodiment.

Figure 17A:
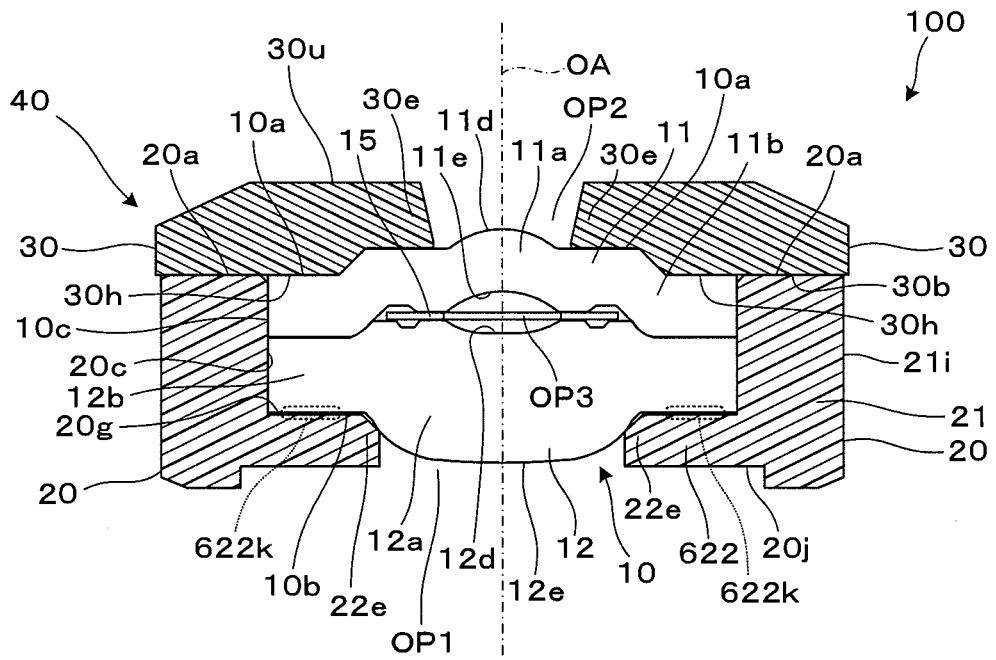
FIGS. 17(A) and 17(B) are cross-sectional views illustrating an image pickup lens unit according to an eighth embodiment.
Figure 17B:
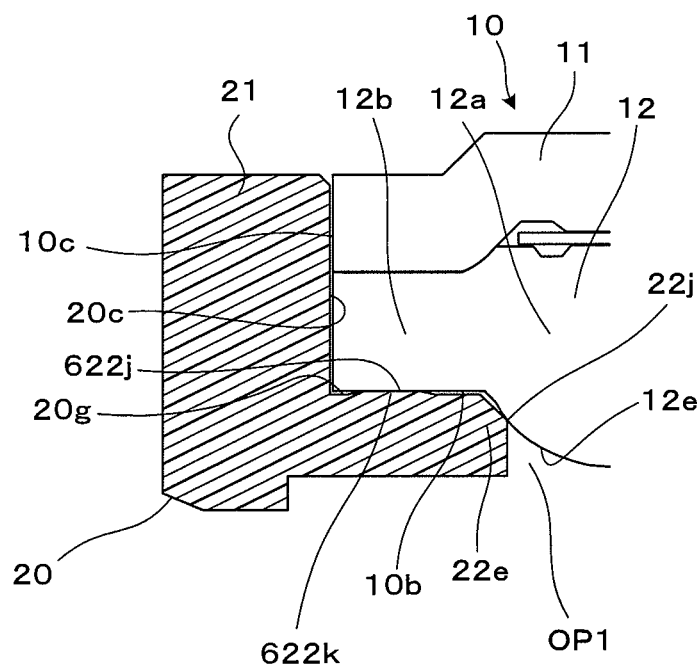

As illustrated in FIGS. 17(A) and 17(B), the inner surface 20g of the bottom 22 of the first holder member 20 has a slightly protruding correcting member 622k. An upper surface 622j of the correcting member 622k is in contact with the second frame surface 10b of the lens 10. The correcting member 622k serves to correct an inclination of the lens 10 from around the second optical surface 12e. The correcting member 622k adjusts the optical axis OA of the lens 10 such that it is not inclined with respect to the optical axis OA of the holder 40. By the correcting member 622k, the position of the lens 10 can be accurately adjusted not only for a direction perpendicular to the optical axis OA, but also for the inclination. The edge portion 22e of the first holder member 20 can also prevent an inclination of the optical axis OA of the lens 10, but the correcting member 622k can reliably prevent an inclination of the optical axis OA of the lens 10.

The correcting member 622k may be annularly formed on the inner surface 20g of the bottom 22 or may be, for example, divided into three protrusions appropriately spaced from one another.

The shape of the first holder member 20 (specifically the edge portion 22e) illustrated in FIG. 17(B) is only an example and may be changed to that illustrated in FIG. 15 or 16.

Ninth Embodiment

An image pickup lens unit and a method for manufacturing the same according to a ninth embodiment will now be described. Note that the image pickup lens unit and the method for manufacturing the same according to the ninth embodiment are modifications of the image pickup lens unit 100 and the method for manufacturing the same according to the fifth or first embodiment. Unless otherwise noted, the image pickup lens unit and the method for manufacturing the same according to the ninth embodiment are the same as those of the fifth or first embodiment.

Figure 18A:
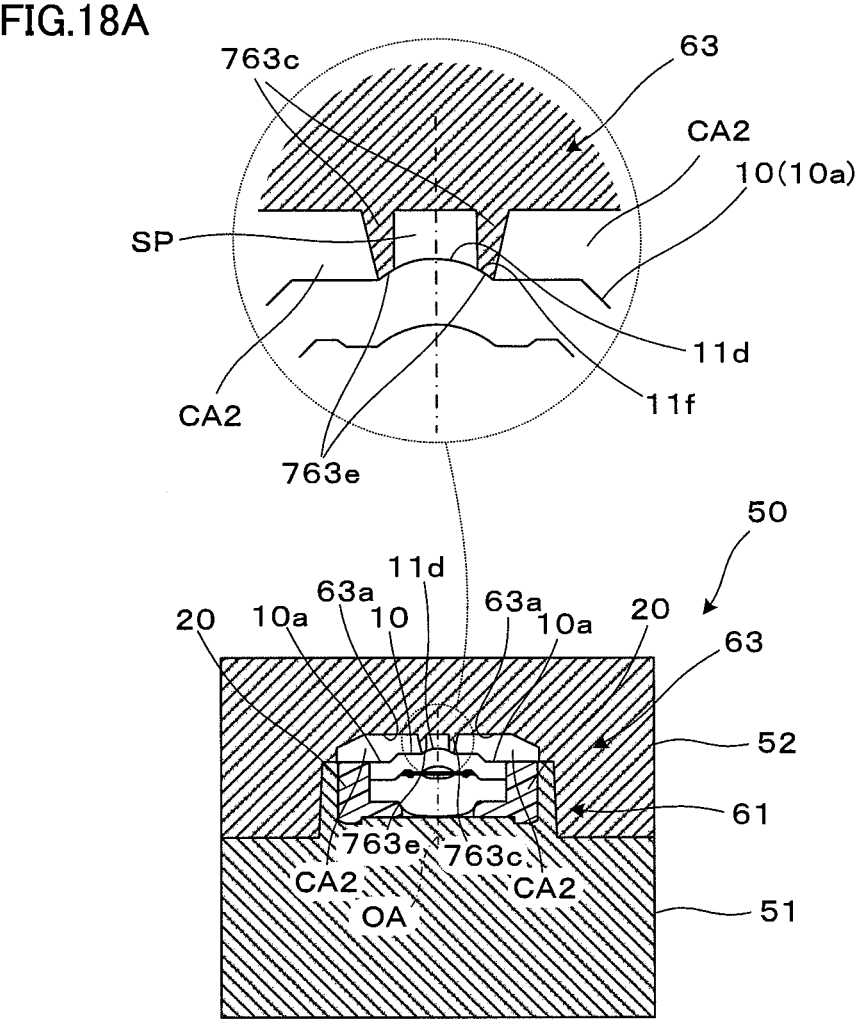
FIGS. 18(A) and 18(B) are cross-sectional views illustrating a manufacturing apparatus for manufacturing an image pickup lens unit according to a ninth embodiment.
Figure 18B:
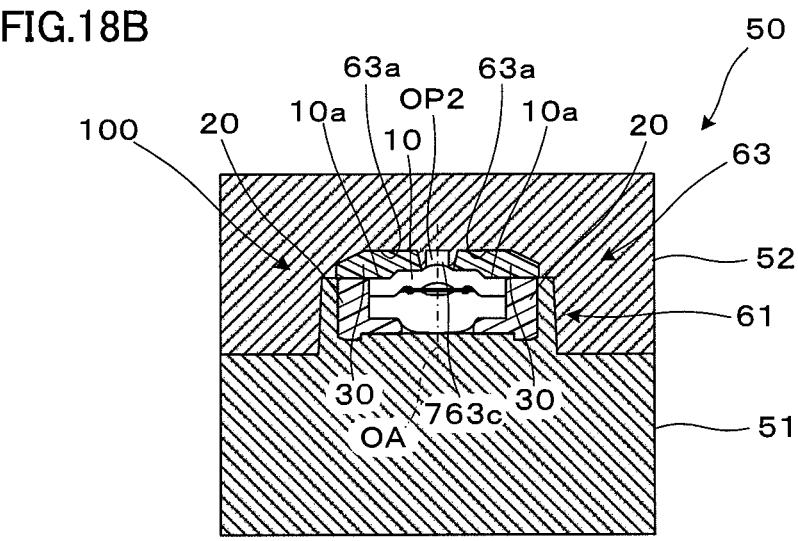

As illustrated in FIGS. 18(A) and 18(B), a fixing member 763c of the third molding portion 63 in the second mold 52 is a circular cylindrical protrusion. An annular end surface 763e at the lower end of the fixing member 763c serves as a contact surface in contact with a slope 11f in a surrounding of the optical surface 11d of the lens 10. Therefore, the annular end surface 763e has the same or substantially the same curvature as the contact portion of the optical surface 11d.

As illustrated in FIG. 18(A), when the first mold 51 and the second mold 52 are clamped to form the cavity CA2 for the second holder member 30 between them, the fixing member 763c of the third molding portion 63 in the second mold 52 presses the surrounding of the first optical surface 11d of the lens 10 on the first holder member 20 in the downward direction. This brings the end surface 763e of the fixing member 763c of the third molding portion 63 into intimate contact with the slope 11f in the surrounding of the optical surface 11d of the lens 10. Here, the first holder member 20 serves as a cushion that elastically supports the lens 10. That is, without scratching the lens 10, it is possible to stabilize the lens 10 in the second cavity CA2 or the first holder member 20 and prevent the lens 10 from generation of a play.

The shape of the first holder member 20 (specifically the edge portion 22e) illustrated in FIG. 18(A) may be changed to that illustrated in any of FIGS. 14, 15, 16, and 17(A).

Tenth Embodiment

An image pickup lens unit and a method for manufacturing the same according to a tenth embodiment will now be described. Note that the image pickup lens unit and the method for manufacturing the same according to the tenth embodiment are modifications of the image pickup lens unit 100 and the method for manufacturing the same according to the fifth or first embodiment. Unless otherwise noted, the image pickup lens unit and the method for manufacturing the same according to the tenth embodiment are the same as those of the fifth or first embodiment.

Figure 19A:
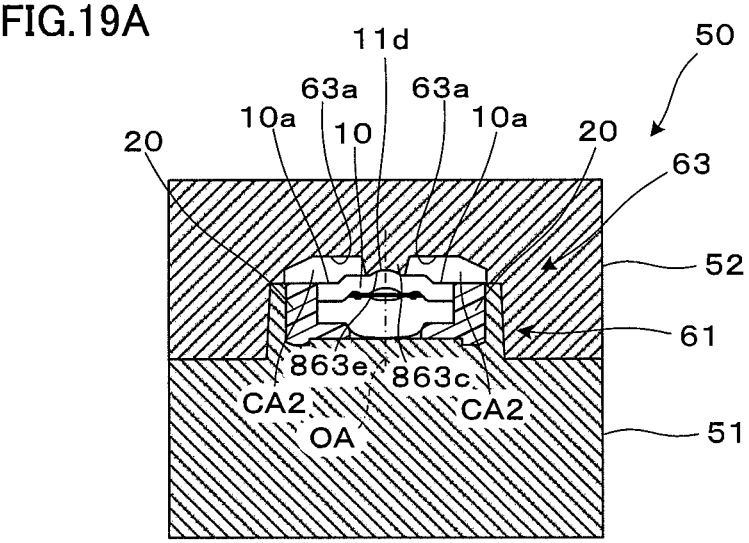
FIGS. 19(A) and 19(B) are cross-sectional views illustrating a manufacturing apparatus for manufacturing an image pickup lens unit according to a tenth embodiment.
Figure 19B:
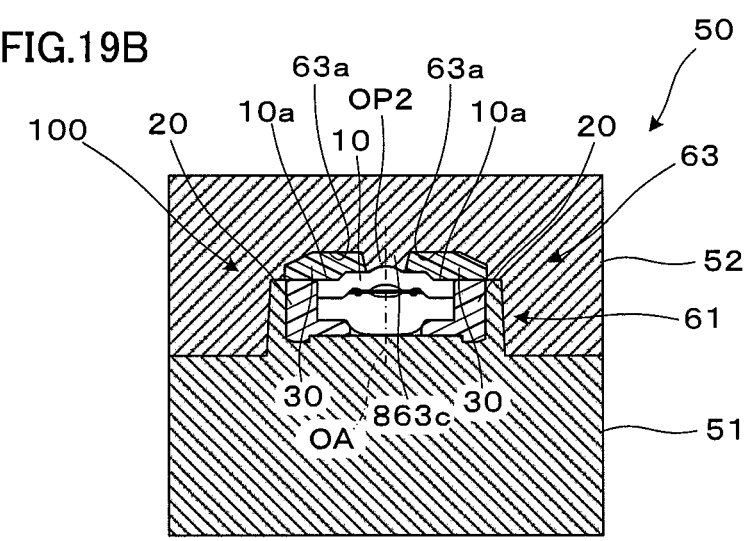

As illustrated in FIGS. 19(A) and 19(B), a fixing member 863c in the third molding portion 63 of the second mold 52 is a circular columnar protrusion. An end surface 863e serving as a contact surface of the fixing member 863c has the same or substantially the same curvature as the optical surface 11d of the lens 10.

As illustrated in FIG. 19(A), when the first mold 51 and the second mold 52 are clamped to form the cavity CA2 for the second holder member 30 between them, the fixing member 863c in the third molding portion 63 of the second mold 52 presses the entire first optical surface 11d of the lens 10 on the first holder member 20 in the downward direction. This brings the end surface 863e of the fixing member 863c in the third molding portion 63 into intimate contact with the entire first optical surface 11d of the lens 10. Here, the first holder member 20 serves as a cushion that elastically supports the lens 10. That is, without scratching the lens 10, it is possible to stabilize the lens 10 in the second cavity CA2 or the first holder member 20 and prevent the lens 10 from generation of a play.

The shape of the first holder member 20 (specifically the edge portion 22e) illustrated in FIG. 19(A) may be changed to that illustrated in any of FIGS. 14, 15, 16, and 17(A).

Although the present invention has been described with reference to embodiments, the present invention is not limited to the embodiments. For example, in the embodiments described above, the lens is positioned by using the edge portion 22e of the first holder member 20 or the inner wall surface of the first holder member 20. In addition to or instead of this, the fixing members 63c and 163c of the second molds 52 and 152 illustrated in FIG. 7 and FIG. 11(A) may be used as positioning members. For example, in the first embodiment, when the first lens element 11 and the second lens element are separate and the stop 15 formed in advance in the first lens element 11 or the second lens element 12 is used, the lens 10 can be positioned in the following manner by the first holder member 20 supported by the first mold 51 and the fixing member 63c (or fixing member 163c) of the second mold 53. First, after steps S13 to S15 in FIG. 3 are performed to position the second lens element 12, the component held by the insertion jig 70 is replaced with the first lens element 11, and steps S13 to S15 in FIG. 3 are performed again. Then step S16 in FIG. 3 is performed. That is, when the second mold 52 on the movable side is set on the first mold 51 on the fixed side, the first lens element 11 on the upper side is positioned by the fixing member 63c of the second mold 52. Note that the positioning members are not limited to the fixing members 63c and 163c described above. The fixing members 763c and 863c illustrated in FIG. 18(A) and FIG. 19(A) may also be used as positioning members.

In the embodiments described above, thermoplastic resin is used as a resin material for forming the holder 40. However, the resin material is not limited to this, and hardening resin, such as thermosetting resin or photo-curable resin, may be used for forming the holder 40.

A mold may be provided with a plurality of molding portions for simultaneously molding holders for a plurality of lenses. This does not require an aligning member for each of the molding portions, and an aligning member common to the plurality molding portions may be used.

The invention claimed is:

1. A method for manufacturing an image pickup lens unit including a lens, a first holder member, and a second holder member configured to hold the lens in cooperation with the first holder member, the method comprising:
   a first molding step of pouring a resin material into a first molding space between first mold and a second mold, and molding the first holder member having a positioning portion for positioning the lens;
   a positioning step of inserting the lens into the first holder member inside the first mold and positioning the lens by bringing the lens into contact with the positioning portion of the first holder member; and
   a second molding step of pouring a resin material into a second molding space between a third mold and the first mold, and molding the second holder member such that the second holder member is welded to the first holder member placed inside the first mold and having the lens positioned therein, the second holder member being configured to prevent the lens from falling off.

2. The method for manufacturing the image pickup lens unit according to claim 1, wherein the lens has a first surface and a second surface on an opposite side of the first surface, the first surface and the second surface including a first optical surface and a second optical surface, respectively; and
   when, in the positioning step, the lens is positioned by being brought into contact with the positioning portion of the first holder member, the lens is positioned by bringing the positioning portion into contact with a surrounding of the second optical surface of the lens.

3. The method for manufacturing the image pickup lens unit according to claim 2, wherein the positioning portion comes into line contact or surface contact with an outer edge of the second optical surface of the lens.

4. The method for manufacturing the image pickup lens unit according to claim 1, wherein the first holder member has a correcting member that corrects an inclination of the lens.

5. The method for manufacturing the image pickup lens unit according to claim 1, wherein the third mold directly presses a first optical surface of the lens against the first holder member.

6. The method for manufacturing the image pickup lens unit according to claim 5, wherein the third mold has a contact portion that faces a surrounding of an optical surface of the lens.

7. The method for manufacturing the image pickup lens unit according to claim 5, wherein the third mold has a contact surface that faces an optical surface of the lens, the contact surface having the same or substantially the same shape as the optical surface.

8. The method for manufacturing the image pickup lens unit according to claim 1, wherein the first holder member has a stop formed to surround an optical surface of the lens.

9. The method for manufacturing the image pickup lens unit according to claim 1, wherein the lens is a single lens component or a lens assembly that is an integrated combination of a plurality of lens elements.

10. The method for manufacturing the image pickup lens unit according to claim 9, wherein the lens assembly is an integrated combination of a plurality of lens elements and a stop interposed between the plurality of lens elements.

11. The method for manufacturing the image pickup lens unit according to claim 1, wherein the lens includes a plurality of lens elements, which are sequentially inserted into the first holder member.

12. The method for manufacturing the image pickup lens unit according to claim 1, wherein the lens has side surfaces that form a rectangular prism-like.

13. The method for manufacturing the image pickup lens unit according to claim 1, wherein at least part of a first molding space for forming the first holder member in the first molding step and at least part of a second molding space for forming the second holder member in the second molding step are created in the same mold.

14. The method for manufacturing the image pickup lens unit according to claim 13, wherein at least part of a third molding space for molding the lens is created in the same mold in which the at least part of the first molding space and the at least part of the second molding space are created.

15. The method for manufacturing the image pickup lens unit according to claim 1, wherein the first and second holder members and the lens are made of reflow heat-resistant material.

16. An image pickup lens unit comprising:
   a lens;
   a first holder member made of resin and having a positioning portion for positioning the lens; and
   a second holder member made of resin and configured to hold the lens in cooperation with the first holder member,
   wherein the first holder member is in contact with the lens without being bonded thereto;
   the second holder member is welded to or adheres to the lens; and
   the first holder member and the second holder member are joined to each other by welding.

17. The image pickup lens unit according to claim 16, wherein the lens has a first surface and a second surface on an opposite side of the first surface, the first surface and the second surface including a first optical surface and a second optical surface, respectively; and the first holder member has a positioning portion that comes into contact with a surrounding of the second optical surface of the lens for positioning the lens.

18. The image pickup lens unit according to claim 17, wherein the positioning portion comes into line contact or surface contact with an outer edge of the second optical surface of the lens.

19. The image pickup lens unit according to claim 16, wherein the first holder member has a correcting member that corrects an inclination of the lens.

20. The image pickup lens unit according to claim 16, wherein the lens is a single lens component or a lens assembly that is an integrated combination of a plurality of lens elements.

21. The image pickup lens unit according to claim 20, wherein the lens assembly is an integrated combination of a plurality of lens elements and a stop interposed between the plurality of lens elements.

22. The image pickup lens unit according to claim 16, wherein the lens has side surfaces that form a rectangular prism-like.

23. The image pickup lens unit according to claim 16, wherein the first and second holder members and the lens are made of reflow heat-resistant material.

24. The image pickup lens unit according to claim 16, wherein the first holder member has a stop formed to surround an optical surface of the lens.

* * * * *